(12) United States Patent
Pamarthy et al.

(10) Patent No.: US 12,542,762 B2
(45) Date of Patent: Feb. 3, 2026

(54) SYSTEMS AND METHODS FOR CONSOLIDATING NETWORK TRAFFIC RULES

(71) Applicant: Aetna Inc., Hartford, CT (US)

(72) Inventors: Varun Pamarthy, Hartford, CT (US); Virender Dhiman, Hartford, CT (US); Salil Jain, Hartford, CT (US); Andrew Hinton, Hartford, CT (US); Christopher Durand, Hartford, CT (US)

(73) Assignee: Aetna Inc., Hartford, CT (US)

( * ) Notice: Subject to any disclaimer, the term of this patent is extended or adjusted under 35 U.S.C. 154(b) by 168 days.

(21) Appl. No.: 18/613,042

(22) Filed: Mar. 21, 2024

(65) Prior Publication Data

US 2025/0168148 A1 May 22, 2025

Related U.S. Application Data

(60) Provisional application No. 63/600,901, filed on Nov. 20, 2023.

(51) Int. Cl.
*H04L 9/40* (2022.01)
*H04L 41/0823* (2022.01)
(Continued)

(52) U.S. Cl.
CPC ...... *H04L 63/0263* (2013.01); *H04L 41/0823* (2013.01); *H04L 43/062* (2013.01);
(Continued)

(58) Field of Classification Search
CPC .......... H04L 2101/618; H04L 41/0823; H04L 43/062; H04L 45/42; H04L 45/74;
(Continued)

(56) References Cited

U.S. PATENT DOCUMENTS

| 10,924,503 | B1 | 2/2021 | Pereira et al. |
| 2010/0011433 | A1* | 1/2010 | Harrison ............. H04L 63/0263 726/12 |

(Continued)

OTHER PUBLICATIONS

Apiletti, Daniele, et al. "Characterizing network traffic by means of the NetMine framework." Computer Networks 53.6: 774-789. (Year: 2009).*

(Continued)

*Primary Examiner* — John M Macilwinen
(74) *Attorney, Agent, or Firm* — Leydig, Voit & Mayer, Ltd.

(57) ABSTRACT

In some instances, a method for generating security rules for a cloud environment is provided. The method comprises: generating one or more dictionary data structures based on a plurality of data logs, wherein each of the one or more dictionary data structures comprise a key and a value; determining one or more recent network traffic rules based on the one or more generated dictionary data structures; determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

20 Claims, 16 Drawing Sheets

(51) Int. Cl.
*H04L 43/062* (2022.01)
*H04L 45/42* (2022.01)
*H04L 45/74* (2022.01)
*H04L 47/12* (2022.01)
*H04L 47/78* (2022.01)
*H04L 47/80* (2022.01)
*H04L 61/301* (2022.01)
*H04L 101/618* (2022.01)

(52) U.S. Cl.
CPC .............. *H04L 45/42* (2013.01); *H04L 45/74* (2013.01); *H04L 47/12* (2013.01); *H04L 47/781* (2013.01); *H04L 47/801* (2013.01); *H04L 61/301* (2013.01); *H04L 63/0236* (2013.01); *H04L 2101/618* (2022.05)

(58) Field of Classification Search
CPC ..... H04L 47/12; H04L 47/781; H04L 47/801; H04L 61/301; H04L 63/0263; H04L 63/20
See application file for complete search history.

(56) References Cited

U.S. PATENT DOCUMENTS

| | | | |
|---|---|---|---|
| 2010/0223499 A1 | 9/2010 | Panigrahy et al. | |
| 2014/0123212 A1* | 5/2014 | Wanser | H04L 63/20 726/1 |
| 2016/0308894 A1* | 10/2016 | Ahn | H04L 63/12 |
| 2018/0255022 A1 | 9/2018 | Kuperman et al. | |
| 2020/0007548 A1 | 1/2020 | Sanghavi et al. | |
| 2021/0026863 A1* | 1/2021 | Mordani | G06F 7/14 |
| 2022/0353284 A1 | 11/2022 | Voros et al. | |
| 2023/0199022 A1 | 6/2023 | Kaidi | |

OTHER PUBLICATIONS

Mahoney, Matthew V., and Philip K. Chan. "Learning rules for anomaly detection of hostile network traffic." Third IEEE International Conference on Data Mining. IEEE. (Year: 2003).*
Golnabi, Korosh, et al. "Analysis of firewall policy rules using data mining techniques." 2006 IEEE/IFIP Network Operations and Management Symposium NOMS 2006. IEEE. (Year: 2006).*
As-Suhbani, Hajar Esmaeil, and S. Khamitkar. "Using data mining for discovering anomalies from firewall logs: a comprehensive review." Int. Res. J. Eng. Technol.(IRJET) 4: 419-423. (Year: 2017).*
"Flow log record examples" https://docs.aws.amazon.com/vpc/latest/userguide/flow-logs-records-examples.html (2024).
"Logging IP traffic using VPC Flow Logs" https://docs.aws.amazon.com/vpc/latest/userguide/flow-logs.html (2024).
"Protocol Numbers" https://www.iana.org/assignments/protocol-numbers/protocol.numbers.xhtml (2024).

* cited by examiner

Data Logs

| interface-id = 'eni-1234' | scraddr = '10.8.15.1' | dstaddr = '10.28.15.8' | srcport = '50001' | dstport = '36119' | protocol = '6' | tcp-flags = '0' |
|---|---|---|---|---|---|---|
| interface-id = 'eni-1234' | scraddr = '10.8.15.1' | dstaddr = '10.28.15.8' | srcport = '50001' | dstport = '36119' | protocol = '6' | tcp-flags = 'SYN' |
| interface-id = 'eni-1234' | scraddr = '10.8.15.1' | dstaddr = '10.28.15.8' | srcport = '50001' | dstport = '36119' | protocol = '6' | tcp-flags = '0' |
| interface-id = 'eni-1234' | scraddr = '10.8.15.1' | dstaddr = '10.28.15.8' | srcport = '50001' | dstport = '36119' | protocol = '6' | tcp-flags = '0' |
| interface-id = 'eni-1234' | scraddr = '10.8.15.1' | dstaddr = '10.28.15.8' | srcport = '50001' | dstport = '36119' | protocol = '6' | tcp-flags = '0' |

Rows labeled 502, 504, 506, 508, 510.

SYSTEMS AND METHODS FOR CONSOLIDATING NETWORK TRAFFIC RULES

CROSS-REFERENCE TO RELATED APPLICATIONS

This patent application claims the benefit of U.S. Provisional Patent Application No. 63/600,901, filed Nov. 20, 2023, which is incorporated by reference herein.

BACKGROUND

Cloud providers may provide cloud services to a plurality of enterprise organizations. For example, using a cloud network, an enterprise organization may instantiate a plurality of virtual machines that perform a plurality of services. Some of the virtual machines may be personal machines for users of the enterprise organization, and other virtual machines (e.g., data collection servers, web servers, database servers, and/or other types of server machines) may perform one or more tasks, functions, and/or services for the enterprise organization. The machines of the cloud network may communicate with other machines within the cloud network or outside of the cloud network using one or more communication protocols and/or ports. A port may be a number that is assigned to uniquely identify a connection endpoint and to direct data to a specific service (e.g., a server machine that exposes services within the cloud network). In some instances, cloud networks can be attacked by malicious entities. As such, securing the cloud network is a major priority of any enterprise organization. However, given that the machines of the cloud network are virtual and code-based, it is difficult to perform this task. Accordingly, there remains a technical need to provide further security to the cloud networks of the enterprise organization.

SUMMARY

In some examples, the present application provides a method and system for cloud micro-segmentation based on traffic direction and/or confidence measures. For example, the enterprise organization may use a cloud network comprising a plurality of machines (e.g., virtual machines (VM)) that communicate with each other as well as machines outside of the cloud network (e.g., via a network). Using a traffic controller, the enterprise organization may monitor the traffic between the machines as well as generate and apply rules (e.g., traffic rules) for the communications between the machines. For example, to prevent malicious attacks, the traffic controller may monitor data logs comprising information associated with the communications between the machines. For example, the data logs may indicate the communications between client machines (e.g., machines requesting service) and server machines (e.g., machines exposing service), including internet protocol (IP) addresses, ports, and/or textual indicators used for the communications. Using the data logs, the traffic controller may determine traffic rules for the cloud network. For example, based on a plurality of data logs within a time period (e.g., the past six months), the traffic controller may determine that a certain server machine (e.g., a web server) only communicates with other machines within the cloud network using a certain range of IP addresses. Based on this determination, the traffic controller may generate and apply a traffic rule indicating that the server machine can only communicate with other machines within the cloud network using this range of IP addresses moving forward. Therefore, if a malicious entity attempts to communicate with the server machine using an IP address that is outside of the range of IP addresses, the traffic controller may apply the generated traffic rule to prevent the malicious entity from communicating with the server machine.

In some instances, the data logs might not indicate a traffic direction for the communications between two machines. For example, the data logs may indicate a source of the communication (e.g., a machine that sends the data packet associated with the data log) and a destination of the data log (e.g., a machine that receives the data packet associated with the data log), but might not indicate the traffic direction (e.g., which machine originated or initiated the initial communication). As such, the traffic controller may analyze the data logs, including determining implicit and explicit information within the data logs, to determine the traffic direction associated with the data logs (e.g., which machine is the client machine that initiated the initial communication and which machine is the server machine that is exposing or providing the services). The traffic controller may then use the determined traffic direction to perform one or more tasks such as generating traffic rules based on the determined traffic direction.

In some examples, the traffic controller may use one or more confidence measures to determine whether to apply the traffic rules. For example, the traffic controller may obtain IP addresses for a certain time period (e.g., IP addresses from data logs within the past six months), and convert the IP addresses into a graphical representation. The traffic controller may use a similarity algorithm and/or metric (e.g., a cross correlation metric) to compare the converted IP addresses with each other, and generate a data structure based on the comparison. Then, the traffic controller may use the data structure to determine whether to apply a traffic rule.

In one aspect, a method for generating security rules for a cloud environment is provided. The method comprises: generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports; determining one or more recent network traffic rules based on the one or more generated dictionary data structures; determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

Examples may include one of the following features, or any combination thereof. For instance, in some examples, the method further comprises: obtaining a first list based on extracting the plurality of server machine IP addresses, the plurality of client machine IP addresses, and the plurality of destination ports from the plurality of data logs, wherein generating the one or more dictionary data structures is based on the first list.

In some instances, obtaining the first list comprises: populating a first field of the first list with the plurality of server machine IP addresses; populating a second field of the first list with the plurality of client machine IP addresses;

populating a third field of the first list with the plurality of destination ports from the plurality of data logs; and discarding a plurality of source ports from the plurality of data logs.

In some examples, the method further comprises: classifying the plurality of server machine IP addresses and/or the plurality of client machine IP addresses into an IP address class from a plurality of IP address classes; and based on classifying the plurality of server machine IP addresses and/or the plurality of client machine IP addresses, generating octets for the plurality of client machine IP addresses, wherein generating the one or more dictionary data structures is based on generating the octets.

In some variations, the method further comprises: generating a second list based on the first list, wherein the second list comprises a plurality of first entries and each of the first entries indicates a client machine IP address octet and one or more destination ports associated with the client machine IP address octet; generating a third list based on the first list and the second list, wherein the third list comprises a plurality of second entries and each of the second entries indicates one or more server machine IP addresses and a combination of the client machine IP address octet and the one or more destination ports; and generating octets for the one or more server machine IP addresses from the third list, wherein generating the one or more dictionary data structures is based on the second list, the third list, and the octets for the one or more server machine IP addresses.

In some instances, generating the one or more dictionary data structures comprises generating a first, a second, and a third dictionary data structure, wherein the key of the first dictionary data structure indicates first IP address octets associated with the server machine IP addresses and second IP address octets associated with the client machine IP addresses, wherein the value of the first dictionary data structure indicates destination ports from the plurality of destination ports, wherein the key of the second dictionary data structure indicates the first IP address octets associated with the server machine IP addresses and the destination ports, wherein the value of the second dictionary data structure indicates the second IP address octets associated with the client machine IP addresses, and wherein the key of the third dictionary data structure indicates the second IP address octets associated with the client machine IP addresses and the destination ports, wherein the value of the third dictionary data structure indicates the first IP address octets associated with the server machine IP addresses.

In some examples, generating the first, the second, and the third dictionary data structure comprises: generating the first dictionary data structure based on the plurality of data logs; generating the second dictionary data structure based on the first dictionary data structure; and generating the third dictionary data structure based on the second dictionary data structure.

In some variations, determining the one or more recent network traffic rules comprises: generating one or more intermediate rules based on using the key of the third dictionary data structure; and generating the one or more recent network traffic rules based on the one or more intermediate rules.

In some instances, generating the one or more recent network traffic rules comprises: generating the one or more recent network traffic rules based on inserting a communication protocol and a traffic direction into the one or more intermediate rules.

In some examples, determining the new recommended network traffic rule comprises: consolidating the one or more recent network traffic rules with the historical proposed traffic rules to obtain a plurality of consolidated network traffic rules associated with a first security group from the one or more security groups; and determining the new recommended network traffic rule based on the plurality of consolidated network traffic rules.

In some variations, consolidating the one or more recent network traffic rules with the historical proposed traffic rules to obtain the plurality of consolidated network traffic rules comprises: determining the one or more recent network traffic rules and the historical proposed traffic rules associated with the first security group; generating a destination port data structure based on the one or more recent network traffic rules and the historical proposed traffic rules associated with the first security group, wherein the destination port data indicates a set of destination ports used for the first security group; and obtaining the plurality of consolidated network traffic rules based on the destination port data structure.

In some instances, consolidating the one or more recent network traffic rules with the historical proposed traffic rules to obtain the plurality of consolidated network traffic rules further comprises: updating the destination port data structure based on a number of destination ports within the set of destination ports and duplicate destination ports within the destination port data structure.

In some examples, consolidating the one or more recent network traffic rules with the historical proposed traffic rules to obtain the plurality of consolidated network traffic rules further comprises: based on determining the one or more recent network traffic rules and the historical proposed traffic rules associated with the first security group, generating merged IP address lists indicating merged client machine IP address octets or merged server machine IP address octets associated with the first security group; and generating one or more intermediate consolidated network traffic rules based on the destination port data structure and the merged IP address lists, wherein obtaining the plurality of consolidated network traffic rules is based on comparing a first number of the one or more intermediate consolidated network traffic rules with one or more thresholds.

In some variations, obtaining the plurality of consolidated network traffic rules comprises: determining to update one or more octets from the client machine IP address octets and the server machine IP address octets based on comparing the first number of the one or more intermediate consolidated network traffic rules with a first threshold; updating the one or more intermediate consolidated network traffic rules based on the one or more updated octets; and obtaining the plurality of consolidated network traffic rules based on the comparing a second number of the one or more updated intermediate consolidated network traffic rules with a second threshold.

In some instances, determining the new recommended network traffic rule comprises: comparing IP address octets from the plurality of consolidated network traffic rules with service tags associated with one or more current network traffic rules; and generating the new recommended network traffic rule based on the comparison.

In some examples, generating the new recommended network traffic rule comprises: generating the new recommended network traffic rule using the service tags associated with one or more current network traffic rules.

In some variations, determining the new recommended network traffic rule comprises: comparing one or more ports from the plurality of consolidated network traffic rules with one or more ports from one or more current network traffic rules; and generating the new recommended network traffic rule based on the comparison.

In some instances, applying the new recommended network traffic rule to the network data transferred between the server machine and the one or more client machines comprises: assigning a priority to the new recommended network traffic rule; and applying the new recommended network traffic rule based on the assigned priority.

In another aspect, an enterprise organization cloud computing platform for generating network traffic rules for a cloud environment is provided. The cloud computing platform comprises one or more processors; and a non-transitory computer-readable medium having processor-executable instructions stored thereon. The processor-executable instructions, when executed by the one or more processors, facilitate: generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports; determining one or more recent network traffic rules based on the one or more generated dictionary data structures; determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

In yet another aspect, a non-transitory computer-readable medium having processor-executable instructions stored thereon is provided. The processor-executable instructions, when executed, facilitate: generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports; determining one or more recent network traffic rules based on the one or more generated dictionary data structures; determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIG. 5 shows exemplary data logs in accordance with one or more examples of the present application.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
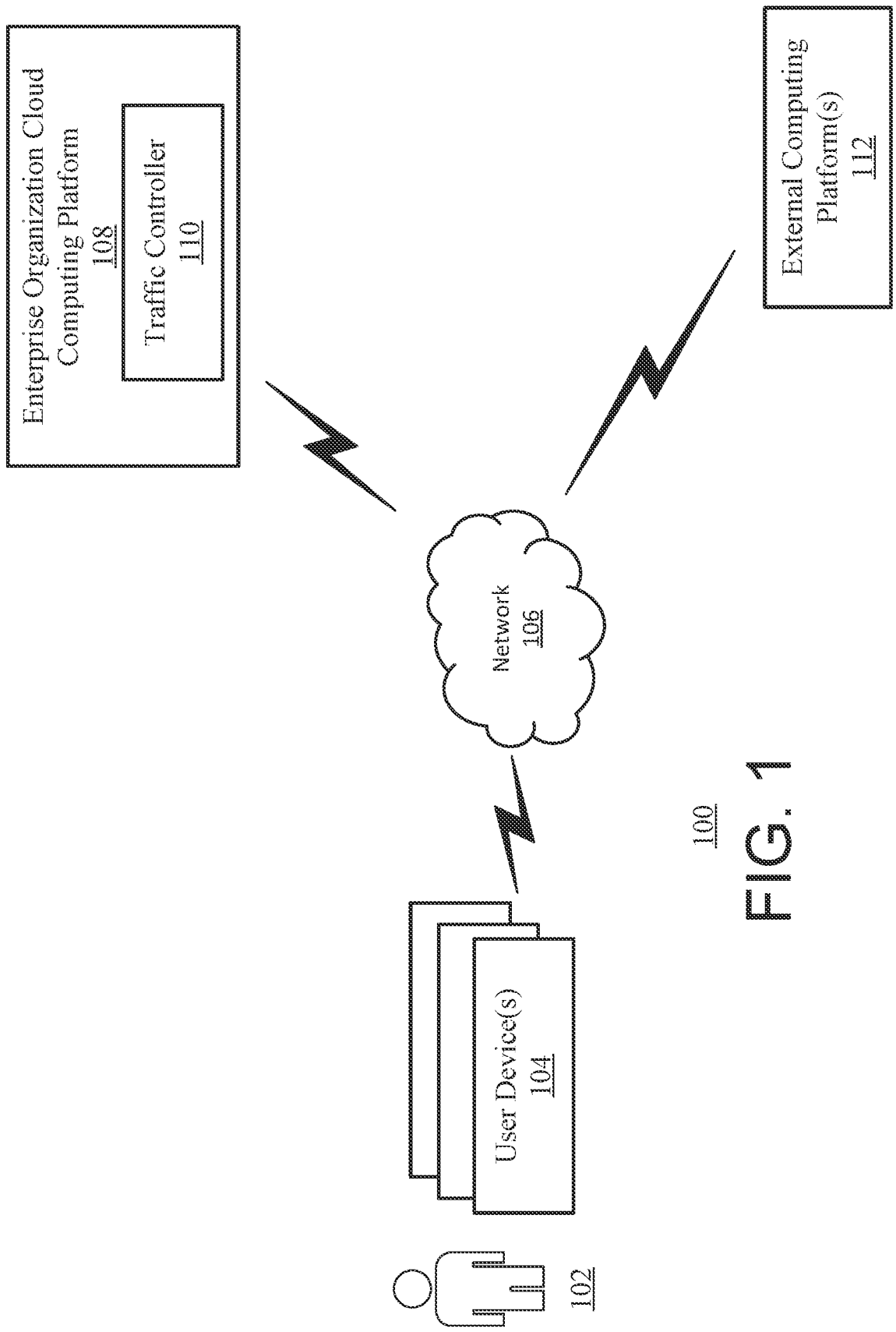
FIG. 1 is a simplified block diagram depicting an exemplary computing environment in accordance with one or more examples of the present application.

Systems, methods, and computer program products are herein disclosed that provide for generating and applying traffic rules to machines. FIG. 1 is a simplified block diagram depicting an exemplary environment in accordance with an example of the present application. The environment 100 includes a user 102, one or more user devices 104, a network 106, an enterprise organization cloud computing platform 108 ("cloud computing platform 108"), and one or more external computing platforms 112. The cloud computing platform 108 includes a traffic controller 110. Although the entities within environment 100 may be described below and/or depicted in the FIGS. as being singular entities, it will be appreciated that the entities and functionalities discussed herein may be implemented by and/or include one or more entities. For instance, the cloud computing platform 108 may include a plurality of computing devices, systems, platforms, and/or servers that are spread across multiple different geographical locations and communicate with each other using direct connections and/or the network 106.

The entities within the environment 100 such as the user devices 104, the cloud computing platform 108, and/or the external computing platforms 112 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with one or more user devices 104. The user devices 104 may perform one or more functions or tasks for an enterprise organization. The enterprise organization may be any type of corporation, company, organization, and/or other institution that provides one or more goods and/or services. The enterprise organization may use a cloud network or cloud computing to provide the goods and/or services. The user 102 may be employed and/or otherwise associated with the enterprise organization, and may use a user device 104 to access the cloud network. In other words, users of the enterprise organization may use the user devices 104 (e.g., the personal devices/machines) to access the cloud network of the enterprise organization. The user devices 104 are and/or include, but are not limited to, desktops, laptops, tablets, mobile devices (e.g., smartphone device, or other mobile device), smart watches, internet of things (IOT) devices, or any other type of computing device that generally comprises one or more communication components, one or more processing components, and one or more memory components. The user devices 104 may be able to execute one or more software applications and/or programs owned, managed, serviced, and/or associated with the enterprise organization.

The cloud computing platform 108 is any type of computing platform that is capable of delivering and/or providing computing resources over the Internet. For example, the cloud computing platform 108 may include an operating system and hardware of one or more servers in an Internet-based data center that allows software and/or hardware products to co-exist remotely and at scale. For example, the cloud computing platform 108 may provide the cloud architecture to host, manage, and/or operate a cloud network for the enterprise organization. In some instances, the cloud computing platform 108 includes and/or is implemented using one or more computing devices, computing platforms, systems, servers, and/or other apparatuses capable of performing tasks, functions, and/or other actions for the enterprise organization. In some variations, portions of the cloud computing platform 108 may be implemented as engines, software functions, and/or applications. In other words, some functionalities of the cloud computing platform 108 may be implemented as software instructions stored in storage (e.g., memory) and executed by one or more processors.

The cloud computing platform 108 includes the traffic controller 110. The traffic controller 110 may be configured to generate, use, and/or apply traffic rules to communications between entities of the cloud network. For example, based on the traffic rules, the traffic controller 110 may prevent certain machines (e.g., VMs) from communicating with other machines. For instance, based on a traffic rule and the IP address and/or textual indicator used by a machine, the traffic controller 110 may prevent the machine from communicating with another machine (e.g., a server machine that exposes or provides services within the cloud network). The traffic controller 110 may monitor traffic such as by generating and/or analyzing data logs. The data logs may indicate communications between the different machines within and/or outside the cloud network. Based on the monitored traffic, the traffic controller 110 may generate and/or apply traffic rules to the communications within the cloud network. In some instances, the traffic controller 110 may determine a traffic direction within the data logs. The traffic controller 110 may use the determined traffic direction to generate the traffic rules. In some examples, the traffic controller 110 may determine one or more confidence measures, and use the one or more confidence measures to determine whether to apply the traffic rules. These will be explained in more detail below.

The external computing platforms 112 are any type of computing platforms that provide external services to machines of the enterprise organization. In other words, the external computing platforms 112 may be any type of computing platform that is not owned or managed by the enterprise organization. For example, the external computing platforms 112 may include a server (e.g., a web-based server) that receives a request from a machine of the cloud computing platform 108 and provides information based on the request. Each of the external computing platforms 112 includes and/or is implemented using one or more computing devices, computing platforms, systems, servers, and/or other apparatuses capable of performing tasks, functions, and/or other actions. In some variations, the external computing platforms 112 may be implemented as engines, software functions, and/or applications. In other words, the external computing platforms 112 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the functionalities of the cloud computing platform 108 may be separated into multiple different entities.

Figure 2:
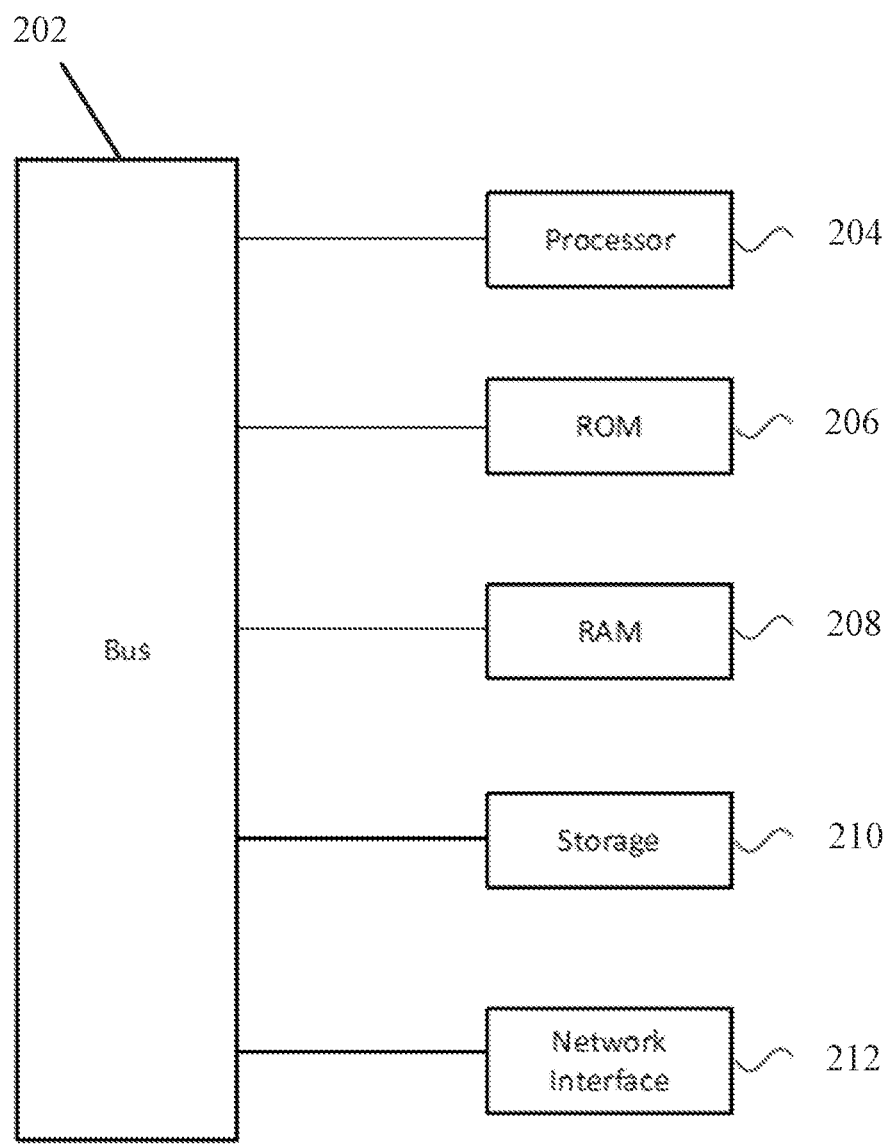
FIG. 2 is a simplified block diagram of one or more devices or systems within the exemplary environment of FIG. 1.

FIG. 2 is a block diagram of an exemplary system and/or device 200 (e.g., the user devices 104 and/or one or more devices within the cloud computing platform 108) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
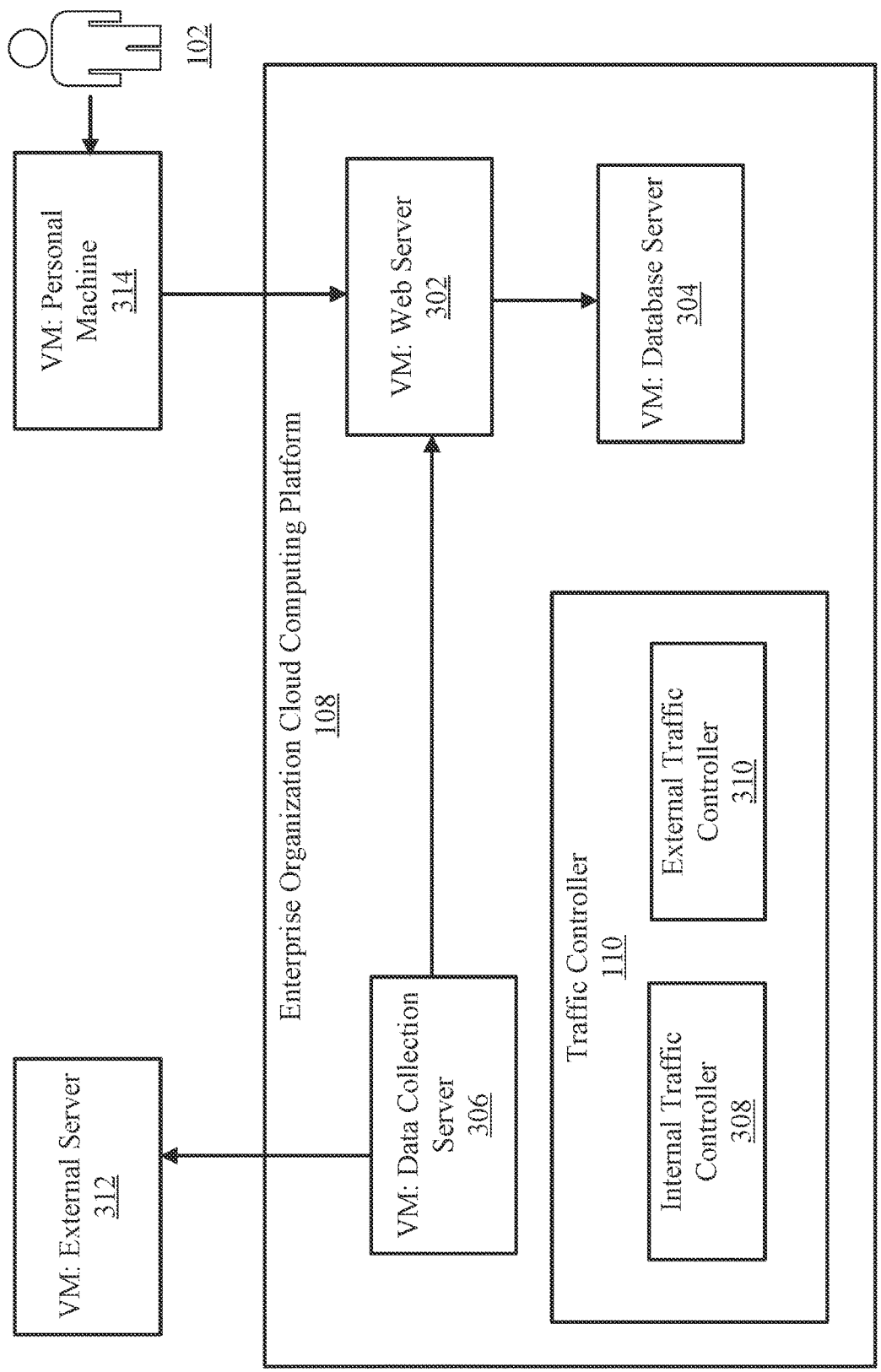
FIG. 3 is a simplified block diagram depicting an exemplary cloud network in accordance with one or more examples of the present application.

FIG. 3 is a simplified block diagram depicting an exemplary environment in accordance with one or more examples of the present application. For example, the environment 300 (e.g., a cloud environment and another environment) includes a plurality of virtual machines (VMs) such as a personal machine 314 associated with the user 102 and an external server 212, which may be hosted by an external computing platform 112. The environment 300 further includes the cloud computing platform 108, the traffic controller 110, and VMs within the cloud computing platform 108 such as the web server 302, the database server 304, and the data collection server 306. The traffic controller 110 includes an internal traffic controller 308 that monitors and/or manages communications between machines within the cloud computing platform 108 and an external traffic controller 310 that monitors and/or manages communications between machines within the cloud computing platform 108 and external machines (e.g., the external server 312 and/or the personal machine 314).

The personal machine 314 may be a VM that is instantiated by the user device 104, and may be used to communicate with machines hosted and/or managed by the cloud computing platform 108. For example, a user 102 may be an employee of the enterprise organization, and may seek to access the cloud network of the enterprise organization that is hosted by the cloud computing platform 108. The VMs of the cloud computing platform 108 may communicate with the personal machine 314. For instance, the VMs of the cloud computing platform 108 may provide cloud computing services ("services") that may be used by the personal machine 314. The cloud computing platform 108 may include hardware that hosts, manages, and/or instantiates the VMs. In some instances, the web server 302 may expose one or more web services that may be accessed by the personal machine 314. The web server 302 may communicate with the database server 304 to obtain relevant data to fulfill the web requests. The data collection server 306 may obtain data through external methods, and may save the data in the database server 304 through the web server 302. Further, the VMs of the cloud computing platform 108 may communicate with VMs outside of the cloud computing platform 108 such as by communicating with the external server 312.

The traffic controller 110 may monitor and/or manage communications by the VMs of the cloud computing platform 108. For example, the traffic controller 110 may monitor data logs and generate/apply traffic rules to manage the communications by the VMs. For instance, based on an IP address used by the personal machine 314 and/or the external server 312 that is outside of the range of IP addresses indicated by a traffic rule, the traffic controller 110 may restrict and/or prevent communications by the personal machine 314 and/or the external server 312 with a VM (e.g., the web server 302) within the cloud computing platform 108. For example, the traffic controller 110 may analyze the traffic between the machines to determine the IP addresses used by the machines. Based on comparing the IP addresses used by the machines with a range of IP addresses indicated by the traffic rule, the traffic controller 110 may determine whether to restrict and/or prevent communications between the machines.

The environment 300 is merely exemplary and may include additional VMs that are not shown in FIG. 3 for simplicity. For example, in some instances, the cloud computing platform 108 may host, manage, and/or operate a plurality of different VMs (e.g., VM servers) that provide a plurality of different services. The environment 300 may further communicate with numerous different personal machines associated with different users and/or with numerous different external servers.

In some instances, the environment 300 and the cloud computing platform 108 may be associated with an on-demand cloud computing provider such as AMAZON WEB SERVICES (AWS), MICROSOFT AZURE CLOUD, and/or GOOGLE CLOUD PLATFORM.

Figure 4:
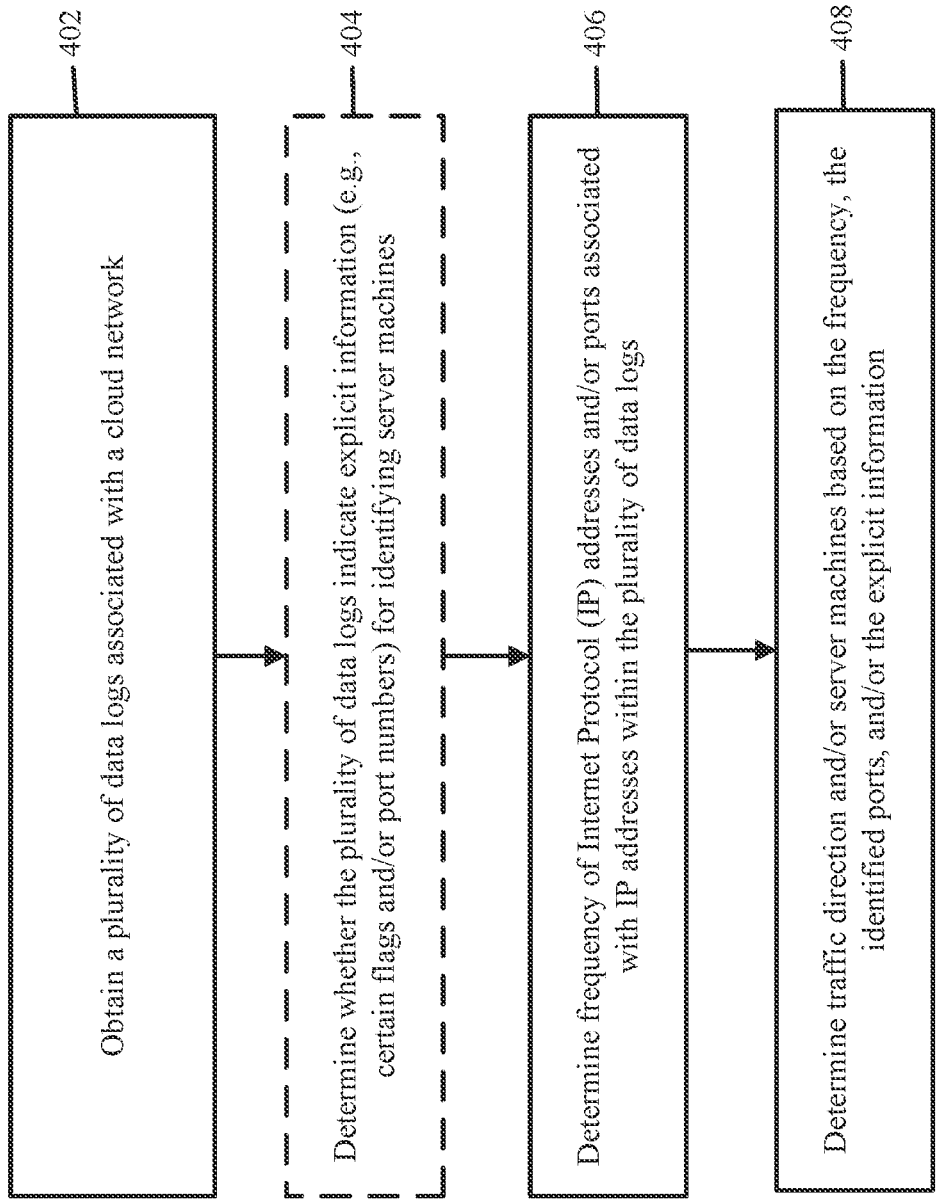
FIG. 4 is an exemplary process for determining traffic directions from data logs in accordance with one or more examples of the present application.

FIG. 4 is an exemplary process for determining traffic directions from data logs in accordance with one or more examples of the present application. The process 400 may be performed by the cloud computing platform 108 and/or the traffic controller 110 shown in FIGS. 1 and 3. It will be recognized that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for determining traffic directions from data logs.

For example, machines (e.g., hardware machines and/or VMs) of the cloud network may communicate with each other and/or with other machines outside of the cloud network. For instance, referring to FIG. 3, the VMs within the cloud computing platform 108 (e.g., the web server 302) may communicate with other VMs within the cloud computing platform, which may be controlled by the internal traffic controller 308. Further, the VMs within the cloud computing platform 108 may communicate with VMs outside of the cloud computing platform 108, which may be controlled by the external traffic controller 310. Data logs may be logged for each such communication. For example, each time a first machine communicates with another machine, a data log may be generated. In some instances, the data log generation and/or monitoring may utilize existing native services from the cloud computing platform 108. In other words, using existing native services, the cloud computing platform 108 may generate and/or monitor the data logs.

In certain cases, the traffic controller 110 may be unable to determine the traffic direction of the communication by solely analyzing the data logs. For example, a first machine (e.g., web server 302) may be in communication with a second machine (e.g., personal machine 314), and data packets may be provided back and forth between the two machines. For each data packet being transferred between the machines, a data log may be generated. For instance, the user 102 may seek to access certain information from the cloud computing platform 108. The user 102, using the personal machine 314, may request information from the web server 302. As such, the personal machine 314 may provide one or more data packets to the web server 302, and each of the data packets may be associated with a data log (e.g., first data logs). The web server 302 may receive the data packets from the personal machine 314 (e.g., the request for information from the user 102), and may provide one or more data packets back to the personal machine 314. Each of the data packets transmitted back to the personal machine 314 may be associated with one or more additional data logs (e.g., second data logs). For instance, the web server 302 may seek authorization information from the personal machine 314, and the data packets sent back to the personal machine 314 may be a request for authorization information. The personal machine 314 may then provide more data packets associated with data logs (e.g., third data logs) to the web server 302 that provide the authorization information (e.g., the username and password). The process may continue and more data logs may be generated/obtained until the personal machine 314 obtains the requested information from the web server 302.

In such instances, the data logs may indicate the source machine (e.g., the machine that sends the data packet associated with the data log) and the destination machine (e.g., the machine that receives the data packet associated with the data log), but in some examples, the data logs might not indicate the traffic direction. As used herein, the traffic direction for the data logs is not defined as a direction of data traffic flowing from the source machine to the destination machine, but rather the traffic direction between a machine that is requesting a service (e.g., a client machine) and a machine that is providing or exposing the service to other machines (e.g., a server machine). In other words, the traffic direction indicates which machine is actually requesting the service and which machine is providing the service. In the example above, the machine requesting the service (e.g., the client machine) may be the personal machine 314 and the machine providing/exposing the service may be the web server 302. During the initial communication (e.g., the data packets associated with the first data logs), the source machine and the destination machine may be the same as the client machine and the server machine, and the flow for the traffic direction may be from the source machine to the destination machine. However, during subsequent communications (e.g., the data packets associated with the second data logs), this might not be the case. For example, during the following communication between the web server 302 and the personal machine 314, the second data logs may indicate that the web server 302 is the source machine and the personal machine 314 is the destination machine. But, the data logs might not have a field that indicates the traffic direction (e.g., which machine is the server machine and which machine is the client machine). In other words, while the web server 302 is providing a request for authorization information from the personal machine 314, the personal machine 314 is still the machine that is providing the original request (e.g., the request to access certain information from the cloud computing platform 108) and the server/client machines have not changed during this subsequent communication. As such, in some instances, because the data logs might not include a field that indicates the traffic direction, the traffic controller 110 may use process 400 to determine the traffic direction.

In some variations, certain machines may be both a server machine and a client machine. For example, to perform a task, the web server 302 may seek to access information from another entity within the cloud environment 300 such as the database server 304. Data packets may be communicated between the web server 302 and the database server 304 to facilitate such communications, and data logs may be generated accordingly. In the communication between the web server 302 and the database server 304, because the web server 302 initiated the request, the web server 302 may be the client machine and the database server 304 may be the server machine. As such, in different communications (e.g., the first communication between the personal machine 314 and the web server 302 and the second communication between the web server 302 and the database server 304), the web server 302 may be both a server machine and a client machine. In other words, a single machine may have both an inbound nature and an outbound nature. The example above describing the traffic direction between the web servers 302 and the database server 304/the personal machine 314 is merely exemplary and other examples of communications between the machines are contemplated herein.

At block 402, the traffic controller 110 obtains a plurality of data logs associated with a cloud network (e.g., the cloud network of the enterprise organization). For example, as mentioned above, the data logs may be associated with communications between different machines within the cloud network. The data logs may include information such as, but not limited to, an interface identifier (ID), a source address (e.g., a source IP address), a destination address (e.g., a destination IP address), a source port, a destination port, a protocol used for the communication, one or more flags (e.g., transmission control protocol (TCP) flags), and/or other information. The interface ID may be used to identify an interface of a particular node and/or identify interfaces on a link (e.g., an ID of a machine that defines the machine that is providing the log). The source and destination address are IP addresses of the source machine and destination machine. The source and destination ports are ways to identify a specific process to which an Internet or other network message is to be forwarded or provided to another machine. For instance, the ports may indicate to use certain protocols or perform certain tasks (e.g., administration control/service (SSH) may use a particular port such as port 22, internet browsing may use another particular port such as port 443, domain name service (DNS) may use yet another particular port such as port 53). There may be numerous ports (e.g., 65,000 ports) used for the communications including standard ports (e.g., port 53 for DNS) and user-defined ports. Protocols may be a set of rules or procedures for transmitting data between the machines. For instance, the protocol "6" may indicate TCP. The flags may indicate control bits that provide descriptions and/or control of the data packet being sent. For instance, a flag of "SYN" for the TCP protocol may indicate that the data packet is the first packet being sent from each end. The flag "FIN" for the TCP protocol may indicate the last packet from the sender.

FIG. 5 shows exemplary data logs 500 in accordance with one or more examples of the present application. For instance, FIG. 5 shows data logs 502-510. Each of the data logs includes information such as the interface ID ("interface-id"), source address ("scraddr"), destination address ("dstaddr"), source port ("srcport"), destination port ("dstport"), protocol, and flags ("tcp-flags"). For example, among other information, the data logs 502-510 indicate that the TCP protocol (e.g., protocol "6") is used and shows the source/destination IP addresses for two different machines. The traffic controller 110 may obtain the data logs in block 402, and then determine the traffic direction based on the data logs. For instance, as shown in FIG. 5, while the source and destination IP addresses/ports are shown, the data logs do not have a field that specifically indicates the traffic direction for the communication. Therefore, the traffic controller 110 may use blocks 404-408 to determine the traffic direction (e.g., which machine is the client machine and which machine is the source machine).

Block 404 is optional. When present, at block 404, the traffic controller 110 determines whether the plurality of data logs indicate explicit information (e.g., certain flags and/or port numbers) for identifying server machines. For example, in some instances, the data logs may indicate certain flags (e.g., TCP flags). For instance, referring to FIG. 5, the field "tcp-flags" may indicate flags associated with the TCP protocol such as "SYN" or "FIN". As shown in data log 504, this data log includes the TCP flag "SYN", which indicates that the data packet associated with this data log is the first data packet being sent between the machines. Accordingly, due to this data log, the traffic controller 110 may determine the traffic direction and/or the server machine associated with the data log. For instance, because of the TCP flag "SYN" indicating that this is the first data packet sent between the machines, then the source machine (e.g., the machine indicated by the source IP address) indicated by the data log would be the client machine and the destination machine would be the server machine. As such, the traffic controller 110 may determine the traffic direction as well as the server machine based on the flag field for the data log 504. For example, based on the data log 504 and the SYN flag, the traffic controller 110 may determine that the client machine would have the IP address of "10.8.15.1" and the server machine would have the IP address of "10.28.15.8". Similarly, if the TCP flag of the data log indicates "FIN", this would indicate the data packet associated with the data log would be the last data packet sent between the machines, the source machine indicated by the data log would be the server machine, and the destination machine indicated by the data log would be the client machine (e.g., the server machine would have the IP address of 10.8.15.1 and the client machine would have the IP address of 10.28.15.8).

Additionally, and/or alternatively, the traffic controller 110 may use the ports identified within the data logs to determine the traffic direction and/or server machines. For example, as mentioned above, certain ports may be standard ports for performing certain tasks or requests (e.g., SSH using port 22, internet browsing using port 443, DNS using port 53). These tasks/request may be associated with a client device or server device. For example, based on the port 443 being within the data logs, the traffic controller 110 may determine the traffic direction and/or server machines. For instance, because port 443 indicates Internet browsing, if the destination port shows port 443, then the traffic controller 110 may determine that the source machine is the client machine and the destination machine is the server machine.

At block 406, the traffic controller 110 determines the frequency of IP addresses and/or ports associated with the IP addresses within the plurality of data logs. At block 408, the traffic controller 110 determines the traffic direction and/or server machines (e.g., IP addresses of server machines) based on the frequency, the identified ports, and/or the explicit information. For instance, when block 404 is performed, the traffic controller 110 may determine the traffic direction and/or server machines for one or more of the data logs (e.g., a first subset of the plurality of data logs). Then, the traffic controller 110 may use blocks 406 and 408 to determine the traffic direction and/or server machines for the other data logs (e.g., a second subset of the plurality of data logs). In other words, the traffic controller 110 may use block 404 to identify the server machines/traffic direction based on the explicit information from the first subset of the plurality of data logs, and may then use blocks 406/408 to identify the server machines/traffic direction of the other data logs (e.g., the second subset) that do not include explicit information (e.g., flags and/or ports that identify which machine is the server machine and which machine is the client machine). If block 404 is not present or performed, the traffic controller 110 may perform blocks 406 and 408 on all of the data logs to determine the traffic direction and/or the server machines.

Figure 6:
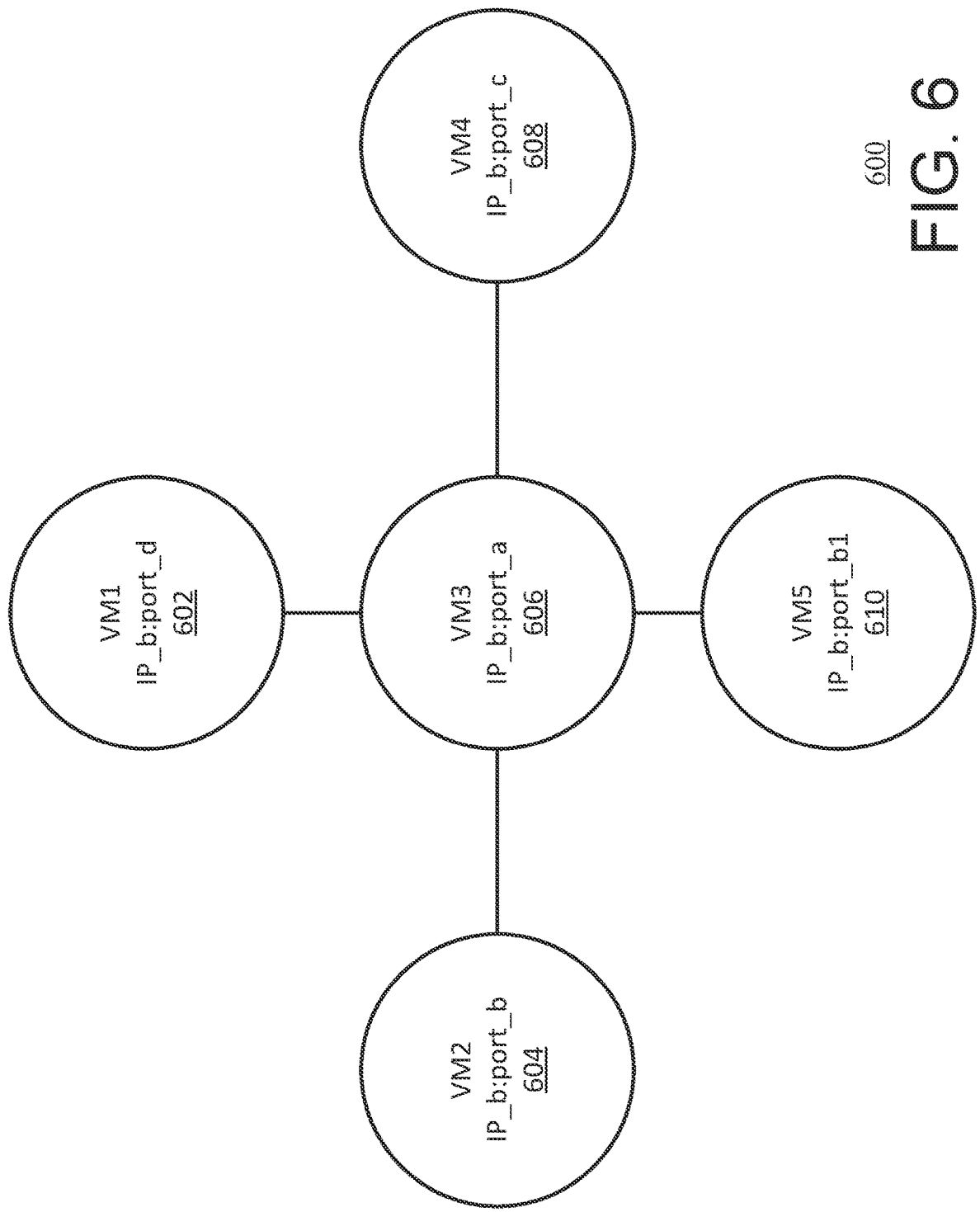
FIG. 6 shows a plurality of machines within a cloud network in accordance with one or more examples of the present application.

Referring to blocks 406 and 408, the traffic controller 110 may use an algorithm, method, or process that is based on the frequency of the IP addresses (e.g., a number of instances a particular IP address appears within the data logs) within the data logs to determine the server machines and/or traffic direction. For example, while FIG. 3 shows only a single personal machine 314, multiple different personal machines 314 associated with multiple different users may request information from the web server 302. Thus, the data logs for those communications may show the web server 302 (e.g., the IP address of the web server 302) more frequently than each of the individual personal machines as each of the personal machines would be associated with a different IP address. As such, the traffic controller 110 may use the frequency of how often an IP address and/or port appears within the data log to determine the traffic direction and/or server machine. This is shown in FIG. 6, which is described below.

For example, at block 406, the traffic controller 110 analyzes the data logs to track the frequency of the IP address. For instance, based on the data logs indicating that the source machine of the data log is not a client machine, the traffic controller 110 may generate and/or update a first data structure (e.g., "ip_port_freq" or IP port frequency) that indicates that the frequency and/or traffic direction of the particular source IP address and/or source port. For example, the first data structure may include a counter, and the traffic controller 110 may increment the counter for the source IP address and source port by one each time the IP address for the machine (e.g., web server 302) appears as a source IP address in the data log. Additionally, and/or alternatively, the first data structure may further include an indicator indicating whether the direction of the source machine is known (e.g., whether the traffic direction is no direction or direction is not known, source machine is server, or destination machine is the server). Additionally, and/or alternatively, the traffic controller 110 may generate and/or update a second data structure (e.g., "ip_port_connect" or the IP port that is connected to the source address). For example, in the second data structure, the traffic controller 110 may record the destination IP address and the destination port. In other words, the first data structure may indicate the frequency of the source IP address associated with a source machine as well as whether the traffic direction of the source IP address is known. The second data structure may indicate the IP addresses and ports (e.g., the destination IP address and destination port) that the source machine is communicating with.

For example, in some variations, the traffic controller 110 may first determine whether the source machine is known to be a client machine. For instance, referring to block 404, based on flags and/or ports from the data logs, the traffic controller 110 may determine whether one or more IP addresses and/or port combinations indicate client machines. For instance, a port combination may be a combination of the source port and the destination port. As mentioned above, the traffic controller 110 may determine whether the source/destination machines are client/server machines based on the source port and/or the destination port. The traffic controller 110 may store information within a data structure (e.g., the first data structure and/or another data structure) indicating that certain IP addresses and/or port combinations are associated with client machines. At block 406, initially, the traffic controller 110 may check whether the source machine is a client machine (e.g., the IP address for the source machine was previously determined to be a client machine). If not, the traffic controller 110 updates the first and second data structures as mentioned above. If so, the traffic controller 110 skips updating the first and second data structures. In some examples, based on the traffic controller 110 not performing block 404, the traffic controller 110 may move straight to updating the first and second data structures.

Additionally, and/or alternatively, the traffic controller 110 may update the first and second data structures based on whether the source machine has been previously identified as a server machine. This step may be performed subsequently or after the first updating based on whether the source machine is a client machine. For example, if the source machine has not been identified as a server, the traffic controller 110 may update the first data structure by incrementing the counter associated with the destination IP address and destination port by one. The traffic controller 110 may further update an indicator indicating whether the direction of the destination machine is known. After, the traffic controller 110 may update the second data structure by recording the source IP address and the source port.

In other words, when the traffic controller 110 encounters a new IP address and/or port combination within a data log (e.g., a new IP address and port in the source IP address or destination IP address and port fields), the traffic controller 110 generates a first and second data structure for the new IP address and/or port combination. Then, each time the traffic controller 110 encounters this IP address and/or port combination in a data log, the traffic controller 110 increments a counter in the first data structure and updates the second data structure to indicate the IP address and port that is communicating with this IP address. As such, after analyzing the plurality of data logs, the traffic controller 110 obtains a first data structure for this IP address and/or port combination indicating whether the traffic direction is known and the frequency that this IP address shows up in the plurality of data logs. The traffic controller 110 further obtains a second data structure for this IP address and/or port combination indicating the IP addresses and ports that were used for communication with this IP address. Therefore, because each data log includes two IP addresses (e.g., source and destination IP addresses), the traffic controller 110 may update two separate first data structure and two separate second data structures (e.g., one for the source IP address and one for the destination IP address) based on the traffic direction not indicating that the source machine is the server and/or the source machine is the client.

To put it another way, as an example, if the data log shows that the source IP address is "10.2.2.3", the source port is "45", the destination IP address is "10.3.2.1", and the destination port is "1222", then the traffic controller 110 initially checks whether the source machine is a client machine (e.g., if the source machine with the source IP address of "10.2.2.3" with/without port "45" has been previously indicated as a client machine). If not, the traffic controller 110 updates the first data structure for the source IP address and/or port combination by indicating that it does not know the direction currently, and incrementing a counter for the source IP address and source port within the first data structure by 1 (e.g., from "5" to "6"). After, the traffic controller 110 updates the second data structure for the source IP address by including in the second data structure the destination IP port and destination IP address (e.g., "10.3.2.1" and "1222"). Then, either in parallel or subsequently, the traffic controller 110 checks whether the destination machine is a server machine. If not, the traffic controller 110 updates the first data structure for the destination IP address and/or port combination by indicating that it does not know the direction currently, and incrementing a counter for the destination IP address and destination port within the first data structure by 1 (e.g., from "2" to "3"). After, the traffic controller 110 updates the second data structure for the destination IP address by including in the second data structure the source IP port and source IP address (e.g., "10.2.2.3" and "45"). In some instances, the traffic controller 110 may check whether the destination machine is a server machine prior to checking whether the source machine is a client machine.

At block 408, after determining the first and second data structures, the traffic controller 110 determines the traffic direction and/or the server machines within the plurality of data logs. For instance, the traffic controller 110 may sort the first data structures for the IP addresses and/or port combinations based on frequency (e.g., highest to lowest). Then, the traffic controller 110 may determine the IP address and/or port combination that occurs most frequently within the plurality of data logs (e.g., the IP address with the counter with the highest value), and determine that the machine associated with this IP address and/or port combination is a server machine. After, because for each communication, one machine is a server machine and the other machine is the client machine, the traffic controller 110 may analyze the second data structure associated with this IP address and/or port combination to determine the IP addresses and ports used to communicate with this IP address and/or port combination. Based on the analysis, the traffic controller 110 may determine that these IP addresses and ports are associated with machines that are client machines. For instance, referring to the example above, if the IP address of "10.2.2.3" is determined as the IP address with the highest value within the data logs, then the traffic controller 110 may determine that the machine associated with this IP address is a server machine. Following, from the second data structure for this IP address, the traffic controller 110 may determine that the IP addresses and ports (e.g., "10.3.2.1" and "1222") is associated with a client machine.

Next, the traffic controller 110 may delete or remove the first and second data structures for the IP addresses and/or port combinations that are determined as client machines, and repeat again for the next highest frequency IP address. For instance, after deleting the first and second data structures, the traffic controller 110 may determine the IP address and/or port combination with the highest frequency value remaining, and determine that the machine with this IP address and/or port combination is a server machine. The traffic controller 110 may analyze the second data structure for this next highest IP address and/or port combination to determine the IP addresses and ports that have communicated with this IP address and/or port combination, and identify those IP addresses and port combination as client machines. The traffic controller 110 may delete the IP addresses and ports of machines that were identified as client machines, and continue until the server machines and client machines have been identified. For instance, as an example, the data logs may indicate five IP address and/or port combinations (first through fifth IP address and/or port combination) that are sorted by frequency. The traffic controller 110 may determine that the first IP address and/or port combination has the highest counter value and determine that the machine associated with the first IP address and/or port combination is a server machine. The traffic controller 110 may then determine that the machine associated with the first IP address communicated with the second and fifth IP addresses and port combinations, determine that machines associated with the second and fifth IP addresses and port combinations are client machines, and delete the data structures associated with these IP addresses and port combinations. Following, the traffic controller 110 may determine the third IP address and/or port combination has the highest counter value remaining, and determine that the machine associated with the third IP address and/or port combination is a server machine. The traffic controller 110 may determine the machine associated with the third IP address and/or port combination communicated with the machine for the fourth IP address and port combination, and determine that the machine for the fourth IP address and port combination is a client machine. The traffic controller 110 may then delete the data structures associated with this IP address and port combination.

In some examples, a single machine may act as both a client machine and a server machine. In such instances, because the machine may use different ports when it acts as a server machine compared to when it acts as a client machine, the machine may be associated with the same IP address, but different port combinations based on whether it is acting as a server machine and a client machine during a communication. As such, based on block 408, the traffic controller 110 may delete or remove the first and second data structures for the IP address and port combination for when the machine acts as a client machine, but keep the first and second data structures for the IP address and port combination for when the machine acts as a server machine. The traffic controller 110 may further indicate that the machine is a server machine based on block 408.

In some instances, when the traffic controller 110 performs block 404, the traffic controller 110 may prioritize the determined explicit information over the frequency. For example, based on the explicit information indicating certain machines/IP addresses and/or port combinations are server machines or client machines, the traffic controller 110 may assign those machines as server machines/client machines. For instance, during the sorting, the traffic controller 110 may first sort by known traffic direction, and then by frequency. As such, in the sorted list, the machines with IP addresses and/or port combinations indicated as server machines would be first in the list, the IP addresses and/or port combinations with the highest frequency would follow, and the machines with IP addresses and/or port combinations listed as client machines would be last. Therefore, the traffic controller 110 may proceed as described above to identify the server machines and client machines, delete the data structures with machines identified as client machines, and then repeat. For example, for the machines identified as server machines, the traffic controller 110 may determine, from the second data structure(s), the machines that communicated with these server machines and identify those as client machines. For the machines identified as client machines, the traffic controller 110 may remove or delete the data structures for these machines.

Afterwards, the traffic controller 110 may provide an output indicating the traffic direction and/or the machines with IP addresses and/or port combinations that were identified as server machines, and the IP addresses/ports that were used in communication with these server machines (e.g., the second data structure). The traffic controller 110 may use this output for one or more tasks such as generating and applying traffic rules to communications within the cloud network 300. This will be explained in further detail in FIG. 7 below.

Additionally, and/or alternatively, the traffic controller 110 may use the traffic direction, the identified server machines, and/or the second data structure for one or more other tasks. For instance, based on the traffic direction, the traffic controller 110 may identify if a machine is connected to the Internet. If so, the traffic controller 110 may monitor this machine more than other machines.

In other words, using process 400, the traffic controller 110 determines traffic directions of the data logs (e.g., which entity or machine is the server machine within the data logs), and may then use the determined traffic directions for one or more tasks such as generating/applying traffic rules. For example, the traffic controller 110 may determine explicit information (e.g., specific ports that are used by server machines and/or specific flags such as "FIN" within the data logs). Based on the explicit information, the traffic controller 110 may determine the traffic direction for a subset of the data logs. For instance, based on comparing the ports within the data logs with specific ports used by the server machines and/or the flag fields within the data logs with flags that identifies the machines as server machines, the traffic controller 110 may assign or determine machines that are server machines. In some examples, as mentioned above, one particular machine may be both a server machine as well as a client machine. As such, based on a specific IP address and/or port combination, the traffic controller 110 may determine whether the particular machine acts as a server machine or a client machine.

Further, the traffic controller 110 may determine the frequency of IP addresses and/or ports within the data logs. For instance, the traffic controller 110 may generate first data structures and second data structures for each of the different IP addresses and/or port combinations within the data logs. Each of the first data structures indicates a number of instances a particular machine associated with a particular IP address and/or port combination appears within the plurality of data logs and each of the second data structures indicates IP addresses and ports of a plurality of machines that the particular machine communicated with within the plurality of data logs. For instance, the first data structures may include a counter indicating how often the particular machine appears within of data logs, and the traffic controller 110 may update the counter each time the IP address and/or port combination for the particular machine appears. Further, updating the counter may be based on whether the particular machine has previously been identified as the server machine or the client machine (e.g., based on performing block 404). In addition, the traffic controller 110 may determine that the particular IP address and/or port combination appears within a first data log and a second data log from the plurality of data logs, and update the second data structure for the particular IP address and/or port combination based on the first and second data logs. For example, as mentioned above, the traffic controller 110 may update the second data structure to indicate IP addresses (e.g., destination or source IP addresses) and ports (e.g., destination or source ports) that the particular machine communicated with/used.

Also, the traffic controller 110 determines the traffic direction based on sorting the IP addresses based on the first data structures (e.g., from highest frequency of appearance to lowest frequency of appearance), and determines the server machines based on the sorting. For example, the traffic controller 110 may determine a first IP address and/or port combination that appears most frequently within the data logs, and determine that a machine for the IP address and/or port combination is a server machine. Then, the traffic controller 110 may use the second data structures to determine second machines that communicated with the first machine (e.g., based on the IP addresses and ports within the second data structure for the first IP address and/or port combination), and may determine these second machines as client machines as well as delete the first/second data structures for the second machines. Following, the traffic controller 110 may determine the next most frequent IP address and/or port combination that now appears in the data logs after the deletion, and determine that the machine associated with this IP address and/or port combination is a server machine. The process may continue until all machines within the data logs have been identified as server machines or client machines.

Afterwards, the traffic controller 110 may generate and apply traffic rules based on the traffic direction. For instance, FIG. 6 shows a plurality of machines within a cloud network in accordance with one or more examples of the present application. The environment 600 includes five VMs 602-610 that use an IP address (e.g., "IP_b") and port (e.g., "port_a" to "port_d") to communicate. The four VMs 602, 604, 608, and 610 communicate with VM3 606, which indicates that VM3 606 is a server machine and the other VMs 602, 604, 608, and 610 are client machines. By using process 400, the traffic controller 110 may determine the traffic direction including that VM3 606 is the server machine because the IP address with port (e.g., "IP_b" and "port_a") of the VM3 606 will be more frequent within the data logs for these five VMs. Further, as shown, VM2 604 and VM5 610 may be different instances of the same VM, and may use "port_b" and "port_b1". For instance, referring back to FIG. 3, each of the VMs, such as the database server 304 may be hosted on a particular hardware device (e.g., hardware server) of the cloud computing platform 108. Therefore, while different, VM2 604 and VM5 610 may perform the same function (e.g., perform the function of the database server 304). For example, in a first instance (e.g., on day 1), the cloud computing platform 108 may create a VM for the database server 304, which may be VM 2 604. Subsequently (e.g., on day 20), the cloud computing platform 108 may create another VM for the database server 304, which may be VM 5 610. As such, both VMs are different virtual machines that may be hosted/managed by the same or different hardware servers within the cloud computing platform 108, but may perform the same tasks/functionalities.

Figure 7:
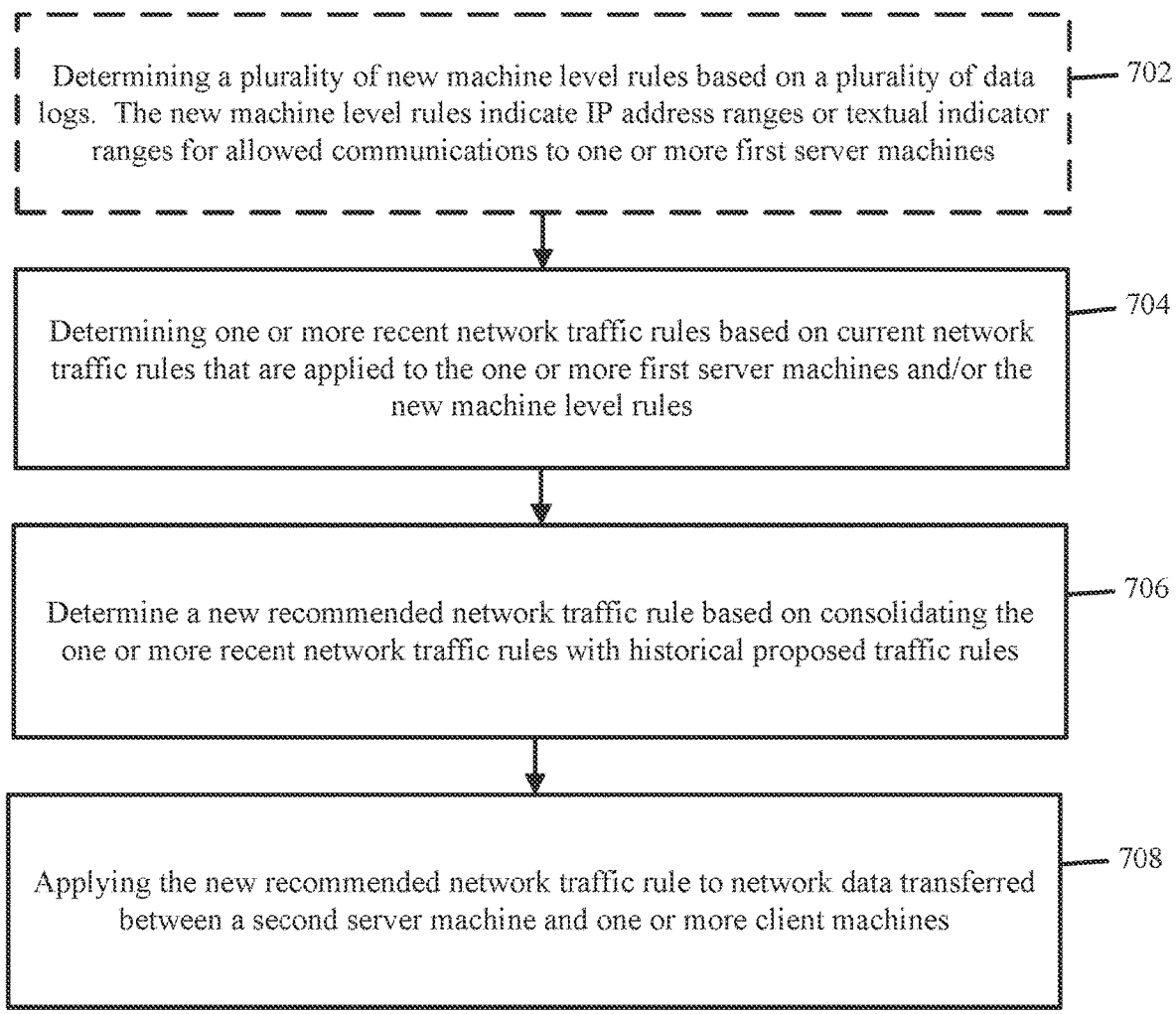
FIG. 7 is an exemplary process for generating and applying traffic rules using cloud micro-segmentation in accordance with one or more examples of the present application.

FIG. 7 is an exemplary process for generating and applying traffic rules using cloud micro-segmentation in accordance with one or more examples of the present application. The process 700 may be performed by the cloud computing platform 108 and/or the traffic controller 110 shown in FIG. 1. It will be recognized that any of the following blocks may be performed in any suitable order, and that the process 700 may be performed in any suitable environment. The descriptions, illustrations, and processes of FIG. 7 are merely exemplary and the process 700 may use other descriptions, illustrations, and processes for generating and applying traffic rules.

For example, using process 700, the traffic controller 110 may generate (e.g., create and/or update) network traffic rules for communications between machines (e.g., virtual and/or hardware machines) within and/or outside the cloud network. The network traffic rules may prevent, restrict, block, and/or otherwise hinder communications between machines (e.g., VMs and/or hardware machines) within and/or outside the cloud network. For instance, referring to FIG. 3, the traffic controller 110 may generate and/or apply network traffic rules to the web server 302. The network traffic rules may block communications between the web server 302 and other entities within environment 300. For example, based on the network traffic rules, the traffic controller 110 may block one or more communications between the personal machine 314 and the web server 302 or communications between the web server 302 and the data collection server 306. For instance, in some variations, the personal machine 314 may be associated with a malicious entity that is seeking to attack the cloud network of the cloud computing platform 108, and gather unauthorized information. The personal machine 314 may provide a request or prompt to the web server 302 to initiate the malicious attack. Using the network traffic rules, the traffic controller 110 may block the malicious attack by the personal machine 314. For instance, the traffic controller 110 may analyze data logs to understand the typical communications that the web server 302 interacts with on a day-to-day basis. For example, over an extended time period (e.g., six months), the traffic controller 110 may determine that the web server 302 has communicated with other machines, including other personal machines, using a specific range of IP addresses and/or using one or more specific ports. Based on this, the traffic controller 110 may generate and apply network traffic rules to block communications outside of the specific range of IP addresses and/or specific ports that were used. When implementing the malicious attack, the personal machine 314 may use an unauthorized IP address and/or port. The traffic controller 110 may compare the IP address and/or port used by the personal machine 314 with the IP address range and/or ports specified by the network traffic rule. Based on the comparison, the traffic controller 110 may block or prevent the communications between the personal machine 314 and the web server 302. As such, the traffic controller 110 may prevent the malicious attack. The traffic controller 110 generating the network traffic rule and applying/using the network traffic rule will be described in further detail below.

In some instances, as mentioned above, a machine (e.g., the web server 302) may be both a server machine and a client machine. The traffic controller 110 may generate, store, and/or apply different network traffic rules based on whether the machine is operating as a server machine or a client machine. For instance, in the example above regarding the malicious attack, the web server 302 is operating as a server machine, and a certain set of network traffic rules may be applied by the traffic controller 110 (e.g., a network traffic rule with certain IP address ranges and/or ports). In other instances, when the web server 302 is operating as a client machine (e.g., requesting information from the database server 304), the traffic controller 110 may apply a different set of network traffic rules. In some instances, the data logs may indicate the traffic direction (e.g., when the cloud computing platform 108 is associated with a particular provider such as AWS and/or MICROSOFT AZURE). The traffic controller 110 may generate the network traffic rules based on the traffic direction indicated by the data logs. In other instances, the data logs might not indicate a traffic direction (e.g., when the cloud computing platform 108 is associated with other providers such as GOOGLE CLOUD PLATFORM). In such instances, the traffic controller 110 may use process 400 to determine the traffic direction, and then use the determined traffic direction to generate the network traffic rules.

In some examples, the traffic controller 110 may generate network traffic rules, but may wait until a steady-state is reached prior to applying the network traffic rules. For example, the traffic controller 110 may obtain data logs for a machine over a time period (e.g., each day) and generate network traffic rules based on these data logs. However, over a subsequent time period (e.g., the following day), the traffic controller 110 may obtain data logs for the machine showing different communication information such as different IP addresses and/or ports. Therefore, the generated network traffic rules for the first day may be different from the generated network traffic rules for the second day. To ensure that proper communications to the machine is still authorized, the traffic controller 110 may wait to apply the network traffic rules until reaching a steady-state (e.g., based on using a threshold or confidence measure and/or based on analyzing the data logs over an extended time period such as six months).

In other words, the traffic controller 110 may generate and/or use different types of network traffic rules, but might not apply the network traffic rules until certain criteria are met. For example, when initializing a machine (e.g., a virtual machine), the traffic controller 110 may apply network traffic rules associated with one or more types of machines. For instance, as mentioned previously, the cloud computing platform 108 may initialize different types of machines that perform different functionalities such as the web server 302 of FIG. 3. In some instances, the cloud computing platform 108 may include multiple instances of a particular machine (e.g., multiple different VMs that function as the web server 302). The traffic controller 110 may apply network traffic rules that are based on the functionality and/or type(s) of the machine, and the network traffic rules that are being currently applied are the current network traffic rules. For example, when initializing one or more web servers 302, the traffic controller 110 may use a configuration template for the type of machine such as for the web servers 302. The configuration template may include one or more current network traffic rules for the web servers 302, which may indicate certain IP addresses, certain ports, and/or certain textual indictor ranges. The textual indicator ranges will be described in further detail below. Therefore, once initialized, the traffic controller 110 may use the current network traffic rules for all machines that provide the same functionality and/or are the same type of machine (e.g., all machines that are web servers 302). In some instances, the current network traffic rules may be applied to multiple types of machines (e.g., the web servers 302 as well as the data collection server 306).

Figure 8:
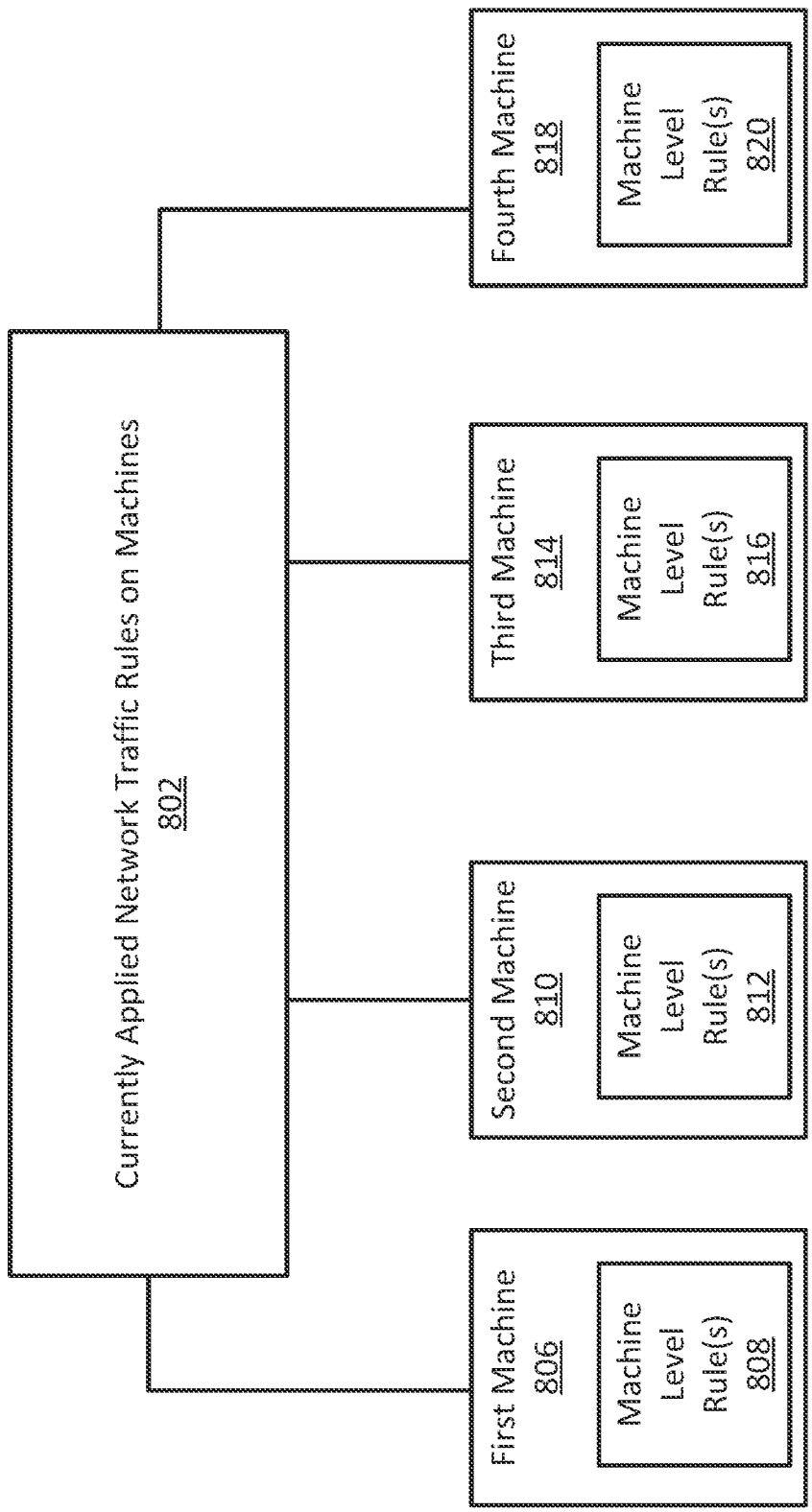
FIG. 8 shows traffic rules being applied to a plurality of machines in accordance with one or more examples of the present application.

In addition, the traffic controller 110 may seek to create and/or update the current network traffic rules based on recent activity by the machines. For example, based on reviewing data logs for a certain time period (e.g., data logs for the current or previous day), the traffic controller 110 may generate new machine level rules for that time period. For example, each day, the traffic controller 110 may analyze the data logs for that day, and generate new machine level rules (e.g., rules indicating certain IP addresses, ports, and/or textual indicator ranges) for each of the machines. For instance, based on four instances of the web server 302, the traffic controller 110 may generate four sets of new machine level rules-one for each of the web servers 302. FIG. 8 shows traffic rules being applied to a plurality of machines in accordance with one or more examples of the present application. For example, the environment 800 shows four machines 806, 810, 814, and 818 (e.g., four web servers 302 or three web servers 302 and one database server 304 that all use the current network traffic rules 802). The traffic controller 110 may apply the current network traffic rules 802 (i.e., the currently applied network traffic rules on machines) to each of the machines 806, 810, 814, and 818. Further, after reviewing the data logs, the traffic controller 110 may generate machine level rule(s) 808, 812, 816, and 820 for each of the four machines 806, 810, 814, and 818. The machine level rule(s) 808, 812, 816, and 820 may be similar to each other (e.g., have similar IP address ranges that were being used) or may be slightly different (e.g., include some overlap of IP address ranges and/or a different IP address range).

After obtaining the new machine level rules, the traffic controller 110 may generate one or more recent network traffic rules based on the new machine level rules and/or the current network traffic rules. The recent network traffic rule may be the consolidated rule for the type of machine based on the data logs for that time period (e.g., for that day or for the previous day). For example, whereas the machine level rules may be for a particular machine (e.g., a particular VM or instance of the web server 302), the recent network traffic rule may be for all machines of that type or provide that functionality (e.g., all of the web servers 302 such as all four machines 806, 810, 814, and 818). The type of machine may be any categorization of the machines and not limited to the above (e.g., not limited to machines that provide the functionality for the web servers 302 and/or the database servers 304). For instance, the traffic controller 110 may categorize machines as the same type of machines even based on applying the same network rule (e.g., current network traffic rule) to the machines. The traffic controller 110 may periodically generate the network traffic rules based on the data logs over the time period. For instance, each day, the traffic controller 110 may generate network traffic rules and store the network traffic rules (e.g., store the network traffic rules for the previous six months). The most recently generated network traffic rules may be the recent network traffic rules and the other stored network traffic rules (e.g., the traffic rules for the previous six months) may be the historical proposed traffic rules. In some instances, the traffic controller 110 may generate the recent network traffic rules based on the current network traffic rules. For instance, the recent network traffic rules may be an update on the current network traffic rules (e.g., the recent network traffic rules may reduce the IP address range from the current network traffic rules).

Based on comparing and/or consolidating the historical proposed traffic rules with the current network traffic rules, the traffic controller 110 may generate a new recommended network traffic rule that is then applied to the machines (e.g., to the web servers 302) moving forward. In other words, the traffic controller 110 may incorporate the new recommended network traffic rule into the current network traffic rules and/or update the current network traffic rules with the new recommended network traffic rule. In some instances, the traffic controller 110 may use a confidence measure and/or other process to determine whether to apply the new recommended network traffic rule. For example, during the comparison, the traffic controller 110 may check how often the current network traffic rule has been generated previously (e.g., how often the current network traffic rule such as a particular IP range shows up in the historical proposed traffic rules). The traffic controller 110 may compare this with a threshold, and may generate the new recommended network traffic rule (e.g., use the current network traffic rule as the new recommended network traffic rule) based on the comparison with the threshold. FIG. 7 will describe the above in more detail.

At block 702, the traffic controller 110 determines a plurality of new machine level rules based on a plurality of data logs. The new machine level rules indicate IP address ranges or textual indictor ranges for allowed communications to one or more first server machines. For instance, the network traffic rules, including the machine level rules, current network traffic rules, recent network traffic rules, historical proposed traffic rules, and/or new recommended traffic rules, may include, but are not limited to, ports for the server machines, IP ranges for the client machines, textual indicators for the client machines, protocols (e.g., communication protocols) used in the communication, and/or traffic direction (e.g., inbound/server rules or outbound/client rules). Based on the data logs, the traffic controller 110 may determine new machine level rules. For instance, the data logs may be associated with a plurality of different machines and the traffic controller 110 may determine the traffic direction (e.g., by using process 400 and/or the traffic direction may be included in the data logs). Further, the traffic controller 110 may analyze the data logs to determine machine level rules (e.g., IP ranges used or ports used) for each of the machines.

Block 702 is denoted in dotted lines to indicate that it is optional. When present, the traffic controller 110 performs block 702. When absent, process 700 moves directly to block 704.

As mentioned previously, in some instances, the traffic controller 110 generates a first data structure and a second data structure for the machine/particular IP address. The second data structure indicates IP addresses and/or ports used by other machines communicating with that particular machine. For instance, the second data structure may indicate that the IP addresses "10.28.15.8", "10.28.15.5", and "10.28.10.3" communicated with the particular machine (e.g., with an instance of the web server 302). Based on the second data structure and the IP addresses, the traffic controller 110 may perform a merging algorithm to determine the new machine level rule. For example, the traffic controller 110 may determine that the first two octets of the IP addresses (e.g., "10.28") remain the same (e.g., matches) whereas the last two octets of the IP addresses are different (e.g., "15.8", "15.5", and "10.3"). Based on the determination, the traffic controller 110 may generate a machine level rule that indicates the first two octets are to be the same at "10.28", but the last two octets may vary. As such, the traffic controller 110 may generate a machine level rule that indicates IP address ranges from "10.28.0.0" to "10.28.255.255" may communicate with the machine. The traffic controller 110 may continue for each of the other machines to generate machine levels rules for the machines (e.g., client and server machines). In some instances, a machine may be both a server machine and client machine. The traffic controller 110 may generate two sets of machine level rules for the machine-one set for the server machine and one set for the client machine.

To put it another way, the traffic controller 110 may determine one or more data logs (e.g., a first set of data logs) from the plurality of data logs that are associated with a particular machine (e.g., based on the IP addresses or other indicators within the data logs). The traffic controller 110 may analyze the determined data logs and then generate machine level rules for the machines based on the analysis. For example, the traffic controller 110 may generate first/second data structures as mentioned above in process 400. Based on the generation, the traffic controller 110 may determine IP addresses, ports, protocols, and/or other information that were used in communications between the particular machine (e.g., the web server 302) and the other machines. The traffic controller 110 may generate the machine level rules based on the determination. For instance, the traffic controller 110 may generate machine level rules indicating ports (e.g., server machine ports), IP address ranges, textual indicator ranges, protocols, and/or traffic direction based on the determination.

In some instances, the data logs may already indicate the traffic direction (e.g., which machine is the server machine and which machine is the client machine for the communication), and the traffic controller 110 might not use process 400. In such instances, the traffic controller 110 may determine the one or more data logs to analyze based on the IP addresses within the data logs (e.g., the IP address for the service machine) and/or based on the textual indicators within the data logs. For example, the textual indicators may be associated with security groups that are applied to the machines and/or tags/service accounts associated with the machines. For instance, the data logs may indicate that textual indicators of machines (e.g., client machines) that communicated with the server machine. In some instances, the textual indicator for machine may be determined through one or more data sources. For instance, the traffic controller 110 may obtain information from a data source indicating the classifications of the textual indicators. Based on the textual indicators, the traffic controller 110 may generate machine level rules. For example, based on the textual indicators indicating a particular security group, a particular service account (e.g., "Sg-1234"), or a particular set of security groups (e.g., "Sg-1234", "Sg-1235", and "Sg-1239"), the traffic controller 110 may generate a machine level rule with the textual indicator.

The plurality of data logs may be associated with a particular time period such as one day's worth of data logs. The traffic controller 110 may determine (e.g., generate) new machine level rules for each time period. For instance, the data logs may be associated with the current day and/or for the previous day, and the traffic controller 110 may generate the machine level rules for the current day and/or for the previous day.

In some instances, the traffic controller 110 may use a merge algorithm to generate the machine level rules. For example, each IP address may be associated with four octets (e.g., "a.b.c.d" where a, b, c, and d may be any number between 0 and 255). For instance, the traffic controller 110 may apply a "/8", "/16", "/24", and/or "/32" function to the IP addresses identified by the set of data logs for the particular "machine. For example, by applying "/8", the traffic controller 110 may determine whether the first octet, "a", is the same within the IP addresses for the set of data logs. Referring to the example above of the IP addresses "10.28.15.8", "10.28.15.5", and "10.28.10.3", the traffic controller 110 may determine that the first octet "10" is the same for the three IP addresses. The traffic controller 110 may apply "/16" to determine whether the second octet, "b" is the same. Using the example above, the traffic controller 110 determines that the second octet "28" is the same. The traffic controller 110 may apply "/24" to determine whether the third octet "c" is the same. In the example above, the third octet is not the same for all three IP addresses (e.g., "15" and "10). Based on these determinations, the traffic controller 110 may generate a machine level rule such that all of the IP addresses from the data logs are encompassed (e.g., based on the "/16", the generated machine level rule may indicate a range from "10.28.0.0" to "10.28.255.255"). In some examples, such as the example shown in FIG. 5, the same IP address may be used throughout the communications. As such, the traffic controller 110 may determine that the third octet "c" and the fourth octet "d" are the same (e.g., by applying "/24" and "/32"), and generate a machine level rule for the particular IP address (e.g., "10.25.15.8"). In other words, the traffic controller 110 may analyze each octet of the IP address (e.g., compare the octet of the IP addresses), and determine the similarities between the octets of the IP addresses (e.g., whether there are similar or the same values within each of the octets). Afterwards, based on the similarities, the traffic controller 110 may generate the machine level rules.

Additionally, and/or alternatively, the traffic controller 110 may generate machine level rules for the ports (e.g., ports of the server machine) that were used in the communications within the data logs. For instance, the traffic controller 110 may determine ports "10000" and "20000" were used in the communications, and may generate machine level rules indicating that only certain ports can access services provided by the server machine (e.g., block ports other than ports "10000" and "20000").

Additionally, and/or alternatively, the traffic controller 110 may generate machine level rules for the protocols used in the communication. For instance, the machine level rules may indicate that only TCP or only TCP and user datagram protocol (UDP) may be used to access services provided by the server machine.

Each of the machine level rules may include one or more of these criteria (e.g., IP range, textual indicator range, port, direction, and/or protocol). For instance, a first machine level rule may only indicate the IP range whereas another machine level rule may indicate IP range and port.

At block 704, the traffic controller 110 determines one or more recent network traffic rules based on the current network traffic rules that are applied to the one or more first server machines and/or the new machine level rules. For example, as mentioned above, the recent network traffic rules may be associated with one or more functionalities and/or one or more particular types of machines. For instance, at block 702, the traffic controller 110 may determine machine level rules (e.g., rules 808, 812, 816, and 820) for each machine (e.g., first through fourth machines 606, 810, 814, and 818). At block 704, the traffic controller 110 may determine recent network traffic rules for a particular type of machine (e.g., for all web servers 302). The traffic controller 110 may use the current network traffic rules and/or the new machine level rules determined from block 702 to generate the recent network traffic rules. For instance, based on the current network traffic rules, the traffic controller 110 may obtain the data logs and determine the new machine level rules. Then, the traffic controller 110 may determine the recent network traffic rules based on the new machine level rules. For example, the traffic controller 110 may perform a similar merging algorithm using the new machine level rules to determine the recent network traffic rules. For instance, in some variations, each of the new machine level rules (e.g., machine level rules 808, 812, and 816) may indicate a different, but aggregating IP range. For instance, the machine level rule 808 may indicate an IP range of "10.28.0.0" to "10.28.12.255", the machine level rule 812 may indicate an IP range of "10.28.10.0" to "10.28.15.255", and the machine level rule 816 may indicate an IP range of "10.28.15.0" to "10.28.15.255". Based on the machine level rules 808, 812, and 816, the traffic controller 110 may determine an aggregation between the machine level rules (e.g., each of the machine level rules 808, 812, 816 would be included in the IP range of "10.28.0.0" to "10.28.15.255"), and may generate the recent network traffic rule based on the overlap (e.g., the recent network traffic rule may be the IP range of "10.28.0.0" to "10.28.15.255"). Additionally, and/or alternatively, similar to block 702, the traffic controller 110 may perform a comparison between each octet of the IP addresses to determine the aggregation, and may generate the recent network traffic rule based on the comparison.

Additionally, and/or alternatively, similar to the above, each of the recent network traffic rules may include one or more of the above criteria (e.g., IP range, textual indicator range, port, direction, and/or protocol). The traffic controller 110 may determine the overlap for each of the criteria, and generate the recent network traffic rule based on the aggregation. For instance, for the specific ports, the machine level rule 808 may indicate ports of "10000" and "20000", the machine level rule 812 may indicate a port of "10000" and "20000", and the machine level rule 816 may indicate a port of "10000". Based on the rules 808, 812, and 816, the traffic controller 110 may determine the aggregation is port "10000" and "20000", and generate the recent network traffic rule indicating the port of "10000" and "20000". The recent network traffic rule may include one or more of these criteria (e.g., just the IP range and/or the IP range as well as the port).

In some examples, the current network traffic rules as well as the recent network traffic rules may be associated only with one type of machine (e.g., web server 302). In such instances, the traffic controller 110 may determine (e.g., obtain) the machine level rules for that particular type of machine (e.g., the rules 808, 812, and 816 for the first through third machines 806, 810, and 814), and use these machine level rules to determine the recent network traffic rules. In other examples, the current network traffic rules as well as the recent network traffic rules may be associated with multiple types of machines (e.g., the web server 302 as well as the database server 304). For example, the first through third machines 806, 810, and 814 may be web servers 302, and the fourth machine 818 may be a database server 304. The traffic controller 110 may determine (e.g., obtain) the machine level rules for all types of machine (e.g., the rules 808, 812, 816, and 820) for the first through fourth machines 806, 810, 814, and 818) that are applying the current network traffic rule, and use these machine level rules to determine the recent network traffic rules. In other words, because the current network traffic rule applies to two or more types of machines, the traffic controller 110 may obtain the machine level rules for each machine that the current network traffic rule is currently being applied to, and use the machine level rules to determine the current network traffic rules.

In some examples, block 702 is denoted in dashed lines to indicate that it is optional. When present, block 704 may be performed as described above. When absent, the traffic controller 110 may determine the recent network traffic rules based on directly merging the determined traffic rules and/or by using one or more additional processes.

At block 706, the traffic controller 110 determines a new recommended network traffic rule based on consolidating the one or more recent network traffic rules with historical proposed traffic rules. For instance, as mentioned previously, periodically (e.g., every day, every two days, or every week), the traffic controller 110 may perform block 704 and generate recent network traffic rules. At block 706, the traffic controller 110 may determine whether to apply the recent network traffic rules. When applied, the traffic controller 110 may determine the recent network traffic rule as a new recommended network traffic rule. Additionally, and/or alternatively, the traffic controller 110 may store the recent network traffic rule in memory. As such, the traffic controller 110 may obtain a plurality of network traffic rules, and each set of network traffic rules may be associated with a different time period (e.g., the traffic controller 110 may store six months of network traffic rules, and each set of network traffic rules may be a different day within the six months). The most recently determined network traffic rule may be the recent network traffic rules (e.g., the network traffic rule for that day of data logs or for the previous day of data logs), and the rest of the network traffic rules may be the historical proposed traffic rules.

The traffic controller 110 may use the recent network traffic rules and the historical proposed traffic rules to determine the new recommended network traffic rules. For example, the traffic controller 110 may use one or more parameters, criteria, and/or algorithms to determine the new recommended network traffic rules based on the recent network traffic rules and the historical proposed traffic rules. In some instances, the traffic controller 110 may use a confidence measure to determine the new recommended network traffic rules. For example, the traffic controller 110 may obtain (e.g., extract) information from the recent network traffic rules (e.g., the criteria such as the IP address ranges, ports, and/or textual indicator ranges from the recent network traffic rules). The traffic controller 110 may determine a frequency that the criteria is within the historical proposed traffic rules. Based on comparing the frequency with a threshold, the traffic controller 110 may determine the new recommended network traffic rules. For instance, the traffic controller 110 may extract the ports and/or the IP address ranges from the recent network traffic rules such as ports of "10000" and "20000" and an IP address range of "10.15.8.0" to "10.15.8.255". The traffic controller 110 may compare the extracted information with the historical proposed traffic rules. For example, the traffic controller 110 may determine that the indicated port "10000" was within six of the historical proposed traffic rules, port "20000" was within twenty, and the IP address range of "10.15.8.0" to "10.15.8.255" was within one hundred. The traffic controller 110 may compare these counts (e.g., the frequency of the recent network traffic rule) with a threshold such as fifty), and based on the threshold, the traffic controller 110 may determine the new recommended network traffic rule. For instance, in the example above, the traffic controller 110 might not implement the rules for the ports, but may implement the rule for the IP address range. As such, the traffic controller 110 may determine the new recommended network traffic rule as the IP address range of "10.15.8.0" to "10.15.8.255" from the recent network traffic rule.

Additionally, and/or alternatively, the traffic controller 110 may determine the new recommended network traffic rule based on the current traffic rules. For example, the traffic controller 110 may compare the current traffic rules with the recent network traffic rule, and based on the comparison, determine the new recommended network traffic rule. For instance, the recent network traffic rule may indicate one or more IP address and/or textual indicator ranges that may be within and/or outside of IP address and/or textual indicator ranges from the current traffic rules. For instance, the recent network traffic rule may indicate an IP address range of "10.15.8.0" to "10.15.8.255", and the current traffic rules may indicate an IP address range of "10.15.0.0" to "10.15.255.255". Based on the IP address and/or textual indicator range of the recent network traffic rule being less than (e.g., within) the range of the IP address or the textual indicator range of the current network traffic rule such as the example above, the traffic controller 110 may replace the current traffic rule with the recent network traffic rule (e.g., the new recommended network traffic rule that is to be used in place of the current traffic rule is to have an IP address range of "10.15.8.0" to "10.15.8.255"). Based on the IP address and/or textual indicator range of the recent network traffic rule being more than (e.g., outside) the range of the IP address or the textual indicator range of the current network traffic rule, the traffic controller 110 may keep the current traffic rule (e.g., discard the new recommended network traffic rule). Based on the IP address and/or textual indicator range of the recent network traffic rule being partially within the range of the IP address or the textual indicator range of the current network traffic rule, the traffic controller 110 may update the upper or lower bound of the rule. For instance, if the recent network traffic rule has an IP range of "10.15.8.0" to "10.15.8.255" and current network traffic rule has an IP range of "10.15.7.0" to "10.15.8.20", the traffic controller 110 may determine the new recommended network traffic rule based on the overlap (e.g., update the lower bound of the current network traffic rule such that the new recommended network traffic rule would have a range of "10.15.8.0" to "10.15.8.20").

In some variations, the traffic controller 110 may use the current traffic rules and/or a confidence measure for block 706. For example, the traffic controller 110 may first determine the confidence measure, and determine the new recommended network traffic rule(s) (e.g., "10.15.8.0" to "10.15.8.255") based on the confidence measure. The traffic controller 110 may then compare the new recommended network traffic rule with the current traffic rules to determine whether to apply the new recommended network traffic rule. For instance, the traffic controller 110 may replace the current traffic rule with the new recommended network traffic rule based on the IP address and/or textual indicator range of the new recommended network traffic rule being less than the range of the IP address or the textual indicator range of the current network traffic rule. The traffic controller 110 may keep the current traffic rule and discard the new recommended network traffic rule based on the IP address and/or textual indicator range of the new recommended network traffic rule being more than the range of the IP address or the textual indicator range of the current network traffic rule.

In some instances, the traffic controller 110 may determine that there have been no new recommended network traffic rules associated with the current traffic rule within a set time period (e.g., within the past six months). In such instances, the traffic controller 110 may remove the current traffic rule altogether. For example, the current traffic rule may indicate a certain port such as "30000". The traffic controller 110 may determine that there have been no new recommended network traffic rules indicating the certain port for the past six months, and may remove the current traffic rule indicating this port.

In some instances, the traffic controller 110 may determine the new recommended network traffic rule based on one or more confidence measure algorithms, which may be used to determine the confidence measure. The confidence measure algorithms are described below in FIG. 9.

At block 708, the traffic controller 110 applies the new recommended network traffic rule to network data transferred between a second server machine and one or more client machines. For instance, the traffic controller 110 may include the new recommended network traffic rule (e.g., range of "10.15.8.0" to "10.15.8.255") as a new current traffic rule and/or replace the current traffic rule with the new recommended network traffic rule. Then, the traffic controller 110 may apply this new traffic rule for communications within the cloud network. For example, when initializing a new server machine (e.g., second server machine), the traffic controller 110 may use an updated configuration template that includes the new traffic rule. As such, the traffic controller 110 may block communications between the new server machine and one or more client machines based on the new traffic rule (e.g., the client machine is using an IP address outside of the IP address range indicated by the new recommended network traffic rule).

Figure 9:
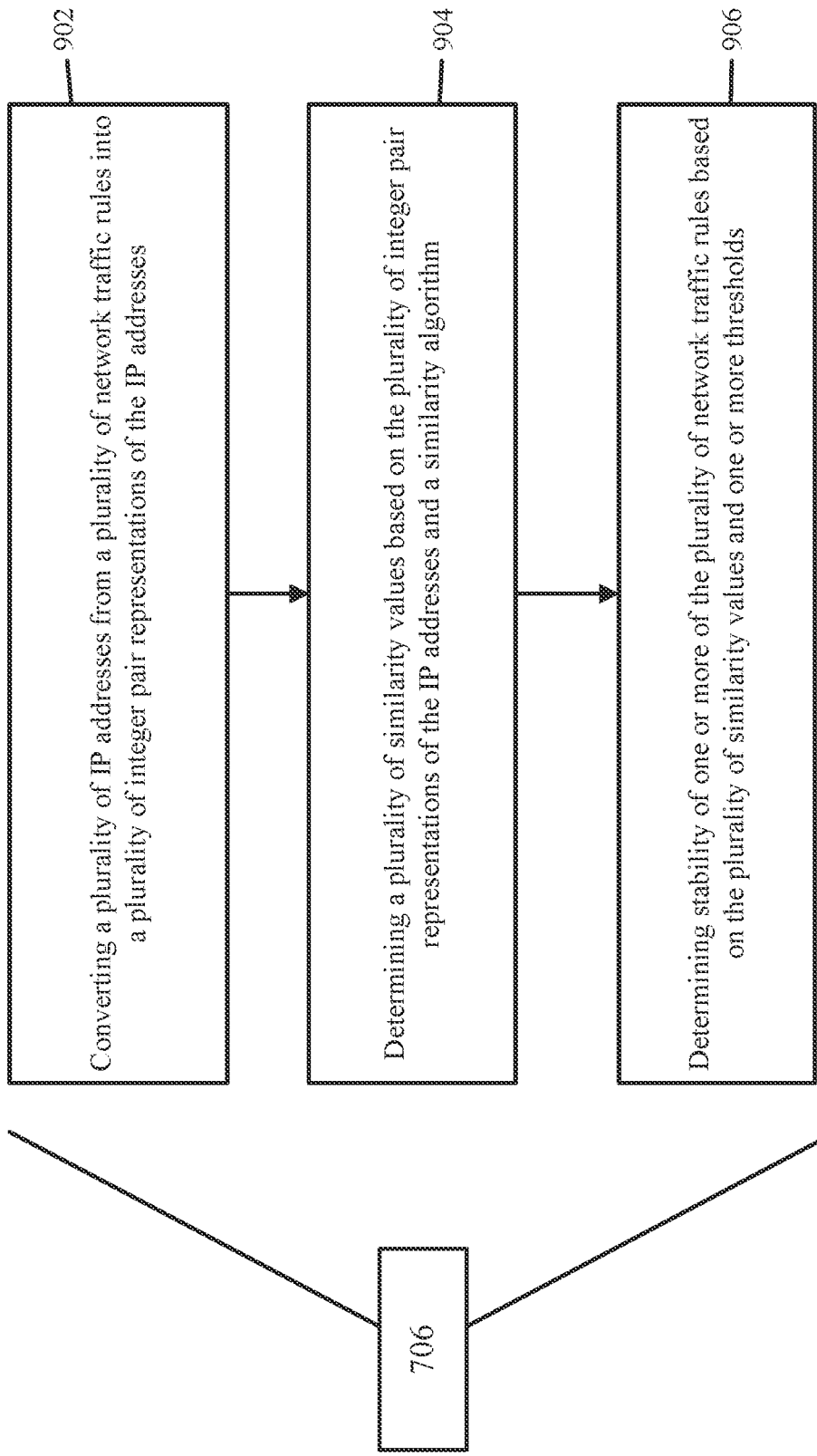
FIG. 9 is another exemplary process for generating and applying traffic rules traffic rules using one or more confidence measures in accordance with one or more examples of the present application.

FIG. 9 is another exemplary process for generating and applying traffic rules traffic rules using one or more confidence measures in accordance with one or more examples of the present application. The process 900 may be performed by the cloud computing platform 108 and/or the traffic controller 110 shown in FIGS. 1 and 3. It will be recognized that any of the following blocks may be performed in any suitable order, and that the process 900 may be performed in any suitable environment. The descriptions, illustrations, and processes of FIG. 9 are merely exemplary and the process 900 may use other descriptions, illustrations, and processes for generating and applying traffic rules traffic rules using one or more confidence measures.

As mentioned above, in some examples, the traffic controller 110 may determine the new recommended network traffic rule based on one or more confidence measure algorithms. Process 900 describes a confidence measure algorithm that the traffic controller 110 may use to determine the new recommended network traffic rule. For example, process 900 may describe an exemplary implementation of block 706 of process 900.

At block 902, the traffic controller 110 converts a plurality of IP addresses from a plurality of network traffic rules into a plurality of integer pair representations of the IP addresses. For instance, as described above, the network traffic rules may indicate one or more IP addresses, and each IP address may include four octets (e.g., "10.28.15.3" or "192.168.123.132"). The traffic controller 110 may convert the IP addresses into numeric representations that may then be used to determine similarity values (e.g., cross-correlation values).

For instance, the plurality of network traffic rules (e.g., the historical proposed rules and the recent network traffic rules) may indicate one or more IP addresses. The traffic controller 110 may first convert the IP addresses into a binary representation (e.g., convert each of the four octets into a binary representation). For example, the traffic controller 110 may convert the IP address "192.168.123.132" into "11000000.10101000.01111011.10000100". Next, the traffic controller 110 may then convert the binary representation into a numerical representation such as an integer representation (e.g., "3,232,267,140"). Then, the traffic controller 110 may determine (e.g., obtain) the integer pair representations based on the numerical representation. For instance, as mentioned above, the network traffic rules may indicate a range of IP addresses such as from [a to b] or "0.0.0.1" to "0.0.0.3". From this, the traffic controller 110 may define and/or use an indicator function (e.g., Eq. (1) below) to map IP ranges for the jth rule (e.g., the jth traffic rule) to a vector of binary values:

$$f_j(i) = \begin{cases} 1, & i \in [a, b] \\ 0, & i \notin [a, b] \end{cases} \text{ where } i \in [0, (2^{32}) - 1]. \quad \text{Eq. (1)}$$

Figure 10:
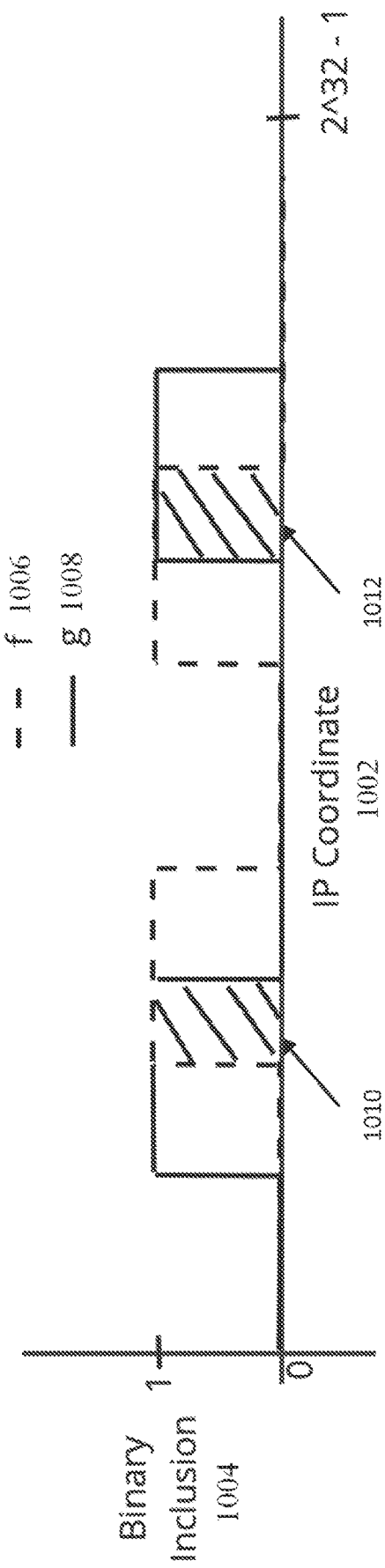
FIG. 10 is a graphical representation depicting IP ranges that are mapped to binary vectors in accordance with one or more examples of the present application.

For instance, in the above example of IP address range, the traffic controller 110 may determine a lower bound of the range as a=1 and the upper bound of the range as b=3 where $f_n$=[0, 1, 1, 1, 0, 0, . . . ]. In other words, in some examples, based on the numerical representations (e.g., the integer pair representations), the traffic controller 110 may determine a vector of binary values, and the vector of binary values may be used to generate a graphical representation of the binary values. For instance, in the example above, the binary representation/integer pair for the IP address range of "0.0.0.1" to "0.0.0.3" would be 1 to 3 (e.g., range of a=1 and b=3). In some variations, the network traffic rules for a particular time period (e.g., for the day) may indicate multiple IP address ranges (e.g., "0.0.0.1" to "0.0.0.3" and "0.0.0.10" to "0.0.0.14"). The traffic controller 110 may use the multiple IP address ranges to generate the vector(s) of binary values. For instance, the binary representation/integer pair for the IP address range of "0.0.0.10" to "0.0.0.14" would be 10 to 14 (e.g., a=10 and b=14), and the binary vector would be $f_n$=[0, 0, 0, 0, 0, 0, 0, 0, 0, 0, 1, 1, 1, 1, 1, 0, 0 . . . ]. As such, the binary vector for that day may be a combination of the binary vectors (e.g., $f_n$=[0, 1, 1, 1, 0, 0, 0, 0, 0, 0, 1, 1, 1, 1, 1, 0, 0 . . . ]. To put it another way, the integer pairs may indicate upper and lower bounds where the value in-between them would be "1", and the other values would be "0". FIG. 10 is a graphical representation depicting IP ranges that are mapped to binary vectors in accordance with one or more examples of the present application. For instance, for a certain day, the traffic rule may indicate IP ranges of "0.0.0.1" to "0.0.0.3" and "0.0.0.10" to "0.0.0.12". The graphical representation 1000 may indicate the IP coordinates 1002 in integer pair form on the x-axis and the binary inclusion 1004 on the y-axis. The vector g 1008 may indicate the binary vector for that day (e.g., $f_n$=[0, 1, 1, 1, 0, 0, 0, 0, 0, 0, 1, 1, 1, 0, 0, 0, 0 . . . ]. The vector f 1006 may indicate another binary vector (e.g., $f_n$=[0, 0, 1, 1, 1, 0, 0, 0, 0, 0, 0, 0, 1, 1, 1, 0, 0 . . . ], which may be associated with the IP ranges of "0.0.0.2" to "0.0.0.4" and "0.0.0.11" to "0.0.0.13". As such, there is an overlap 1010 and 1012 between the vectors 1006 and 1008. For example, both vectors have the IP addresses of "0.0.0.2" to "0.0.0.3" and "0.0.0.11" to "0.0.0.12". The values of IP addresses and binary vectors for FIG. 10 described above are merely exemplary and may represent any value of IP addresses and binary vectors. For instance, as shown, the overlaps 1010 and 1012 appear to be of a similar size to the non-overlapped portions of vectors 1006 and 1008, which may be different from the example above.

At block 904, the traffic controller 110 determines a plurality of similarity values based on the plurality of integer pair representations of the IP addresses and a similarity algorithm (e.g., a dot product). A similarity value (e.g., a similarity metric) may be a metric that quantifies the pairwise intersections between a set of network traffic rules formed by the union between historical and recent network traffic rules. For example, the traffic controller 110 may compare the network traffic rules with each other, and determine similarity values based on the comparison. For instance, the network traffic rules may include recent network traffic rules and historical proposed rules (e.g., four days of rules with the recent network traffic rules being the most recent day, and the historical proposed rules being the other three days). The traffic controller 110 may perform pairwise comparison between each of the days of rules (e.g., compare day 1 to day 2, day 1 to day 3, day 1 to day 4, day 2 to day 3, day 2 to day 4, and day 3 to day 4), and determine similarity values for each comparison. The traffic controller 110 may generate a data structure (e.g., a dot product matrix) and store the determined similarity values into the data structure.

For example, for each comparison, the traffic controller 110 may compare the binary vector representations of the IP address ranges for one day of rules (e.g., the recent network traffic rule) with the binary vector representations of the IP address ranges for another day of rules (e.g., day 2) and determine the overlap between the binary vector representations. For instance, referring to FIG. 10, the traffic controller 110 may generate a graphical representation 1000 for the binary vectors for two days (e.g., a first day denoted by vector f 1006, and a second day denoted by vector g 1008). The traffic controller 110 may determine the overlap (e.g., overlap 1010 and 1012 denoting an overlap of IP addresses that are common to both days).

Then, based on the overlap/similarity metric, the traffic controller 110 may determine a similarity value (e.g., a similarity metric). For instance, each day of network traffic rules may indicate one or more IP address ranges (e.g., vectors f and g 1006 and 1008 show two IP address ranges). For instance, the first day of rules (e.g., the first historical proposed rules) may be mapped to binary vector representation and defined as f (e.g., f 1006) and the second day of rules (e.g., the second historical proposed rules) may be mapped and defined as g (e.g., f 1008). At block 902, the traffic controller 110 may convert the set of IP address ranges into binary vector representations (e.g., $f_n$ from Eq. 1). The traffic controller 110 may then determine the overlap between the binary vector representations (e.g., whether the two binary vector representations for the first day overlap with the two integer pair representations for the second day, and the extent of the overlap), and determine a similarity value based on the overlap and a similarity algorithm.

In some instances, the traffic controller 110 may use a normalized dot product (NDP) as the measure of similarity to enable uniform comparison. In other words, the traffic controller may use NDP to determine the similarity value. The normalized dot product metric may generate a similarity value between 0 and 1 with 0 indicating the ranges defined by f and g would be completely different and 1 indicating that the ranges would be completely the same. The NDP is defined below in Eq. 2:

$$\text{Normalized } Dot \text{ product} = f \cdot g = \frac{\sum_{i=0}^{2^{32}-1} f(i)g(i)}{\sum_{i=0}^{2^{32}-1} f(i) + g(i)} \quad \text{Eq. (2)}$$

For instance, using the NDP, the traffic controller 110 may determine an overlap of values between a first and second vector of binary values (e.g., the numerator of Eq. 2) and determine an aggregation of the first and second vector of binary values (e.g., the denominator of Eq. 2). Based on the overlap and the aggregation, the traffic controller 110 may determine the similarity value (e.g., the overlap divided by the aggregation).

Additionally, and/or alternatively, the traffic controller 110 may generate an array data structure to store the similarity values. For example, the data structure may be a matrix (e.g., NDP Matrix) with the columns and rows representing all pairwise comparisons between n days.

$$NPD \text{ Matrix} = M = \begin{bmatrix} f_1 \cdot f_1 & \cdots & f_1 \cdot f_n \\ \vdots & \ddots & \vdots \\ f_n \cdot f_1 & \cdots & f_n \cdot f_n \end{bmatrix}$$

After comparing each day to every other day, the traffic controller 110 may input information into the matrix. The traffic controller 110 use only certain entries within the array based on the redundancy (e.g., the similarity metric for day 1 and day 2 is the same as day 2 and day 1). For instance, the first entry (e.g., "$f_1 \cdot f_1$") may be the similarity metric for day 1 and day 1 (e.g., comparison between the traffic rules for day 1), which would be 1 as they would be completely the same. The entry below that would be "$f_2 \cdot f_1$", which would show a similarity metric for day 1 and day 2. The entry to the right of the first entry would be "$f_1 \cdot f_2$", which would also show a similarity metric for day 1 and day 2, and would be the same as the entry for "$f_2 \cdot f_1$". As such, the traffic controller 110 may determine entries for the NDP matrix and may use only certain entries (e.g., unique entries) within the NDP matrix.

At block 906, the traffic controller 110 determines stability of one or more of the plurality of network traffic rules based on the plurality of similarity values and one or more thresholds. For instance, based on determining the distribution, confidence interval, temporal stability, and/or significance threshold of a metric, the traffic controller 110 may infer the stability of the network traffic rules. The stability of the network traffic rules may be measured in numerous different ways. For example, in some instances, the stability of rules may be broadly categorized into two categories: temporal and overall. The traffic controller 110 may use the temporal and/or overall stability processes to determine the stability of the network traffic rules.

From the temporal stability perspective, the traffic controller 110 may define (e.g., determine) a temporal stability similarity vector v from M as:

$$v = \{m_{i1}\} \text{ for } i \in [2, \ldots, n]$$

Using v, the traffic controller 110 may infer a notion of temporal stability using statistical processes, mathematical processes, and/or machine learning models. For example, the traffic controller 110 may measure the temporal stability based on applying a linear regression model to v (where the regressor is time) and examining the distribution and patterns of the residuals. In some variations, the traffic controller 110 may then compare the temporal stability with one or more thresholds to determine whether the network traffic rule are stable. In other words, using the similarity values (e.g., the NDP values), the traffic controller 110 may determine the temporal stability (e.g., a temporal stability metric) based on using statistical, mathematical (e.g., linear regression models), and/or machine learning models. The traffic controller 110 may determine whether the network traffic rule is, from the temporal perspective, stable based on comparing the temporal stability metric with one or more thresholds.

From the perspective of overall stability, the traffic controller 110 may infer the stability of the network traffic rules using data described in M. For example, from graph theory, the traffic controller 110 may treat (e.g., determine) M as a weighted adjacency matrix where days represent nodes and edges represent the similarity between each day. From this, the traffic controller 110 may utilize various statistics from graph theory to infer rule stability. For instance, the traffic controller 110 may derive a notion of rule stability based on an overall stability metric (e.g., the mean weighted degree or mean strength). For example, the traffic controller 110 may determine a mean weighted degree or mean strength based on the similarity values (e.g., the matrix M). The traffic controller 110 may compare the mean weighted degree or mean strength with one or more thresholds to determine whether the network traffic rules are stable. In some examples, the mean strength of the graph, which in this example represents the mean NDP ($\overline{NDP}$) between nodes (i.e., days), may be used to assess overall stability.

Additionally, and/or alternatively, the traffic controller 110 may use a predefined or empirically derived threshold α (e.g., NDP>α where α=0.95) to identify rules that meet stability requirement. For instance, the traffic controller 110 may define and use the threshold level a to set the stability level. Then, based on the a level, the traffic controller 110 may determine which network traffic rules to recommend as new network traffic rules (e.g., the new recommended network traffic rules). Returning to process 700, the traffic controller 110 may apply the new recommended network traffic rule.

Figure 11:
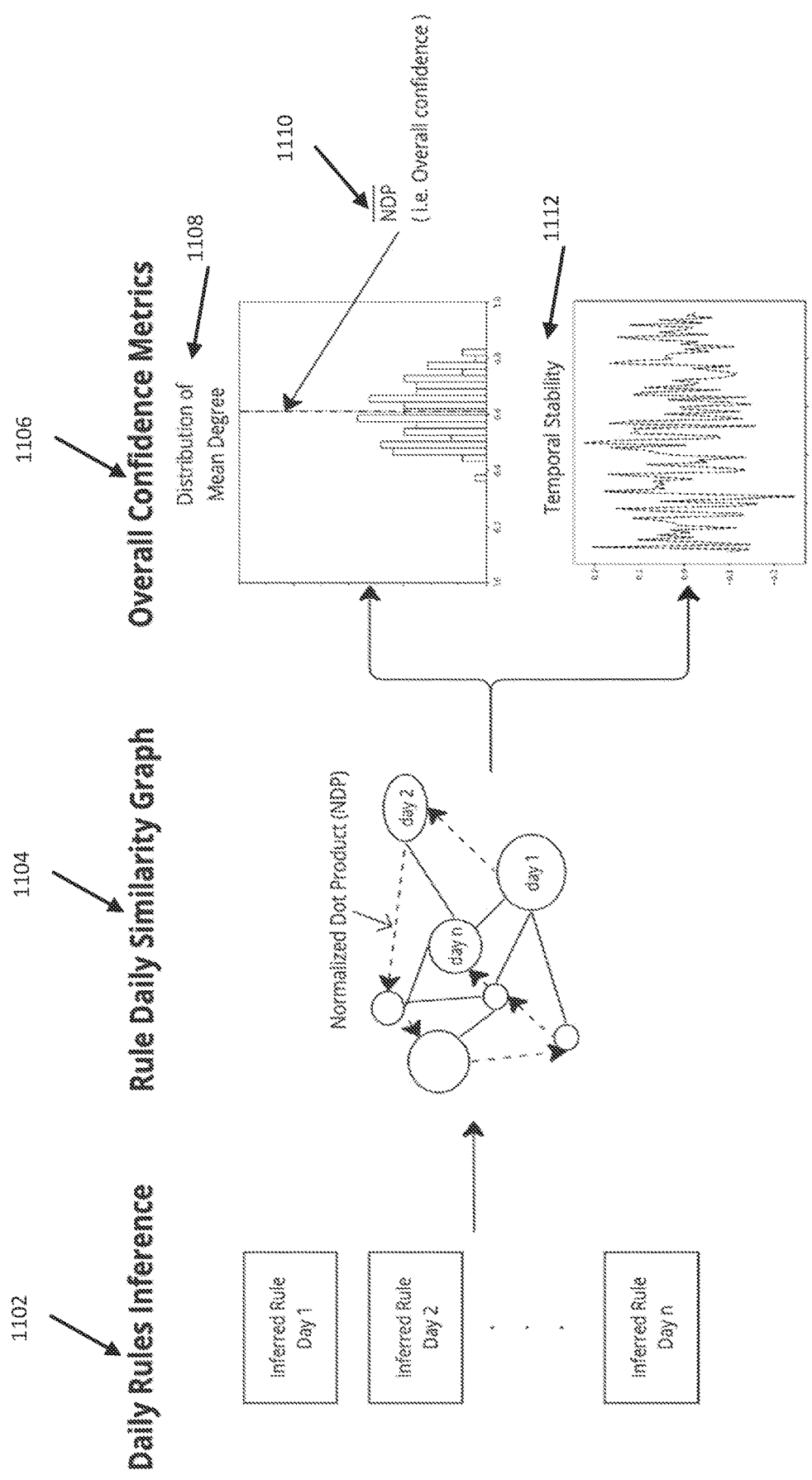
FIG. 11 shows an exemplary usage of graphical representations to determine and apply traffic rules in accordance with one or more examples of the present application.

FIG. 11 shows an exemplary usage of graphical representations to determine and apply traffic rules in accordance with one or more examples of the present application. For instance, FIG. 11 shows how inferred rules can be used to create a similarity graph using a NDP where the mean degree distribution and temporal stability can be computed and may be used as measures of overall confidence. For example, at step 1102, the traffic controller 110 may perform the daily rules inference. Then, at step 1104, the traffic controller 110 may generate and use a rule daily similarity graph with nodes and edges that are described above. After, at step 1106, the traffic controller 110 may generate graphical representations of the distribution of mean degree 1108 and temporal stability 1112. The distribution of mean degree 1108 may include the $\overline{NDP}$ or overall confidence 1110. The traffic controller 110 may use the graphical representations of the distribution of mean degree 1108 and temporal stability 1112 to determine stability of the network traffic rules.

Figure 12:
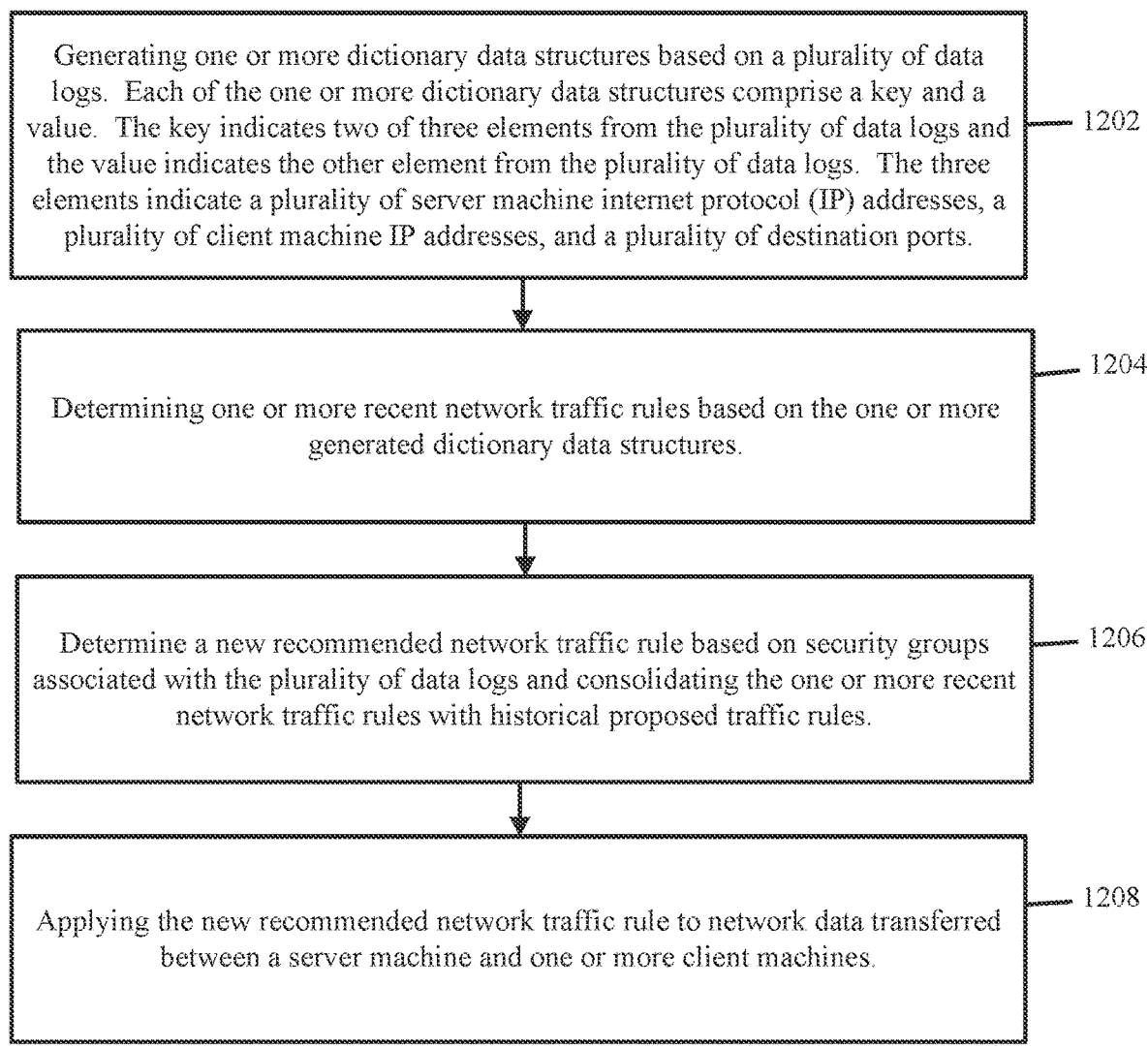
FIG. 12 is another exemplary process for generating and applying traffic rules using cloud micro-segmentation in accordance with one or more examples of the present application.

FIG. 12 is another exemplary process for generating and applying traffic rules using cloud micro-segmentation in accordance with one or more examples of the present application. The process 1200 may be performed by the cloud computing platform 108 and/or the traffic controller 110 shown in FIG. 1. It will be recognized that any of the following blocks may be performed in any suitable order, and that the process 1200 may be performed in any suitable environment. The descriptions, illustrations, and processes of FIG. 12 are merely exemplary and the process 1200 may use other descriptions, illustrations, and processes for generating and applying traffic rules.

For example, certain cloud computing platforms 108 may include and/or utilize multiple different variables (e.g., the client IP addresses, the server IP addresses, and/or the destination ports). As such, due to having more variables, the cloud computing platforms may utilize process 1200. Process 1200 will be described in relation to FIGS. 13-16 below.

At block 1202, the traffic controller 110 generates one or more dictionary data structures based on a plurality of data logs. Each of the one or more dictionary structures comprise a key and a value. The key indicates two of three elements from the plurality of data logs and the value indicates the other element from the plurality of data logs. The three elements indicate a plurality of server machine internet protocol (IP) addresses, a plurality of client machine IP addresses, and a plurality of destination ports. For example, referring to FIG. 5, the data logs 502-510 may indicate information such as a source IP address, destination IP address, source port, destination port, and/or other information. In some instances, as mentioned above, the traffic controller 110 may use process 400 to determine the traffic direction (e.g., which machine is the client machine and which machine is the server machine). In other instances, the traffic controller 110 may determine that the traffic direction is indicated within the data logs (e.g., when the cloud computing platform 108 is associated with MICROSOFT AZURE and/or AWS, the data logs indicate whether the data log is an inbound or outbound data log). Based on the traffic direction (e.g., inbound or outbound traffic direction), the traffic controller 110 may determine the client IP addresses (e.g., client machine IP addresses) and the server IP addresses (e.g., server machine IP addresses) from the source IP addresses and the destination IP addresses. Then, using the client/server IP addresses, the traffic controller 110 may determine the dictionary data structures. This will be described in more detail using FIG. 13.

Figure 13:
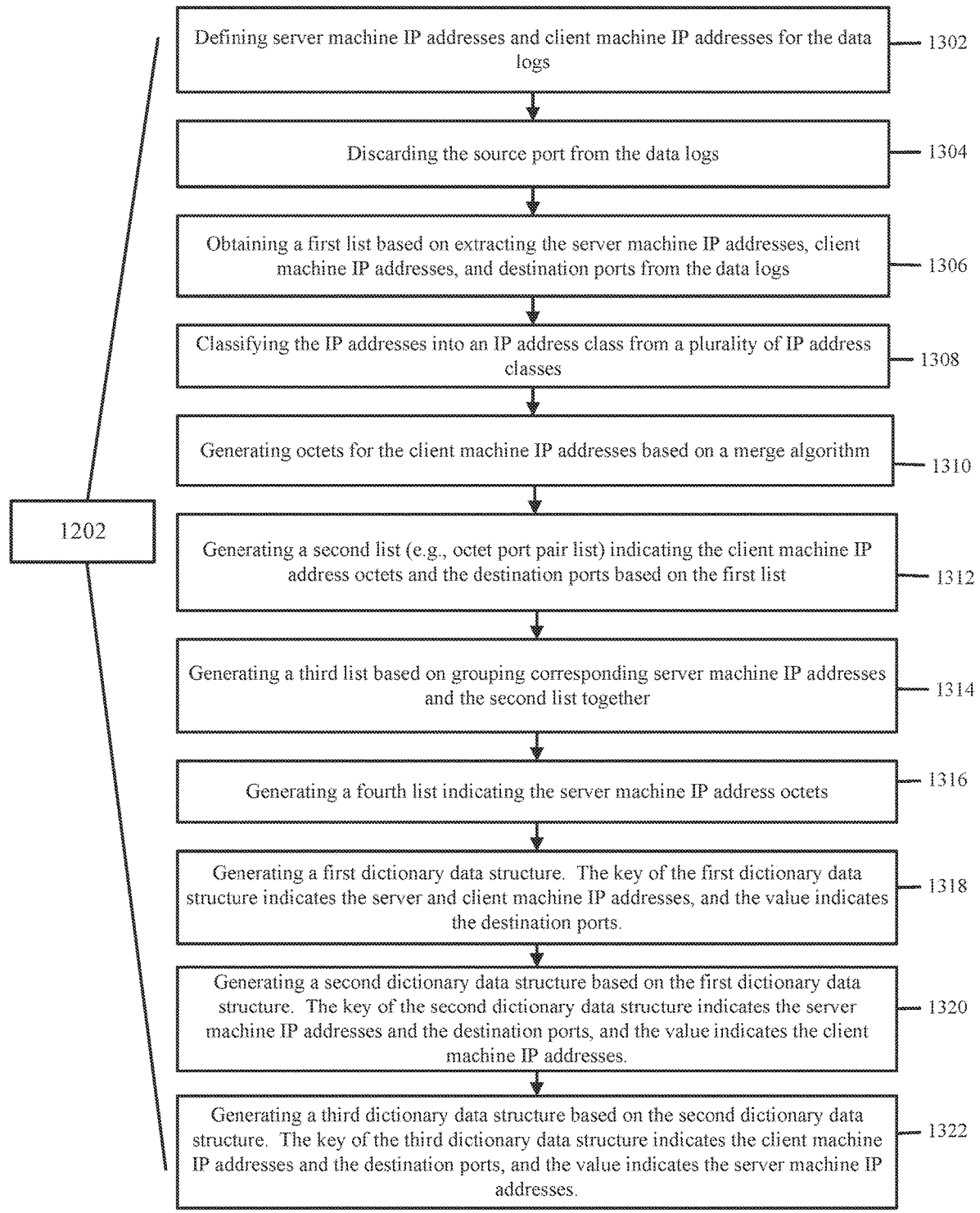
FIG. 13 is an exemplary process for generating dictionary data structures based on data logs in accordance with one or more examples of the present application.

FIG. 13 is an exemplary process for generating dictionary data structures based on data logs in accordance with one or more examples of the present application, and will be used to describe block 1202 of FIG. 12 in more detail. The process shown in FIG. 13 may be performed by the cloud computing platform 108 and/or the traffic controller 110 shown in FIGS. 1 and 3. It will be recognized that any of the following blocks may be performed in any suitable order, and that the process may be performed in any suitable environment. The descriptions, illustrations, and processes of FIG. 13 are merely exemplary and the process may use other descriptions, illustrations, and processes for generating dictionary data structures based on data logs. Further, process may describe an exemplary implementation of block 1202 of process 1200, but in other examples, the traffic controller 110 may use other implementations to generate the dictionary data structures, which are then used to determine the recent network traffic rules.

Using the process shown in FIG. 13 and the data logs (e.g., data logs associated with the MICROSOFT AZURE cloud network), the traffic controller 110 may generate restrictive inbound and outbound security rules to replace the overly permissive default rules (e.g., the current traffic rules). In operation, at block 1302, the traffic controller 110 defines (e.g., determines) the server machine IP addresses and the client machine IP addresses for the data logs. For example, as mentioned above, the data logs may indicate whether the data log is associated with inbound traffic or outbound traffic. Additionally, and/or alternatively, for certain cloud networks (e.g., the MICROSOFT AZURE cloud network), the data logs may indicate whether it is associated with a particular traffic direction (e.g., outbound traffic direction). As such, the source IP addresses are the client IP addresses and the destination IP addresses are the server IP addresses. Further, the source ports are the ports associated with the client machines and the destination ports are the ports associated with the server machines. Therefore, at block 1302, based on the data logs, the traffic controller 110 determines the server machine IP addresses and the client machine IP addresses for the data logs (e.g., the server machine IP addresses are the destination IP addresses within the data logs and the client machine IP addresses are the source IP addresses for the data logs).

At block 1304, the traffic controller 110 discards the source port from the data logs. For instance, the traffic controller 110 ignores the source port field from the data logs to remove noise from the data logs, and only considers the destination ports. For example, the client machine may use a dynamic port (e.g., ports associated with 30,001 to 65,000) to create a connection with the server machine. Because the client machine can use any port to initiate the connection, it might not be as useful to use these ports for the security rules. Instead, the traffic controller 110 may only use the destination ports.

At block 1306, the traffic controller 110 obtains a first list based on extracting the server machine IP addresses, client machine IP addresses, and destination ports from the data logs. For instance, based on blocks 1302 and 1304, the traffic controller 110 may generate a first list that indicates the server machine IP addresses, client machine IP addresses, and destination ports. For instance, the first list may include numerous entries. Each entry may be for a particular server machine IP address and may include three total elements (e.g., the particular server machine IP address, the destination port, and the client machine IP address(es)). For instance, as an example, for two data logs, the two entries may be as follows: first entry: "10.82.100.125", "22", ["10.242.14.28", "157.121.110.238"] and the second entry: "10.82.100.125", "88", ["10.18.22.19", "10.93.23.206", "10.89.34.155"]. In other words, the first entry may indicate a first element (e.g., the particular client machine IP address—"10.82.100.125"), a second element (e.g., the destination port—"22"), and a third element (e.g., the server machine IP addresses—"10.242.14.28" and "157.121.110.238"). Similarly, the second entry may indicate the first element (e.g., the client machine IP address—"10.82.100.125"), the second element (e.g., the destination port—"88"), and a third element (e.g., the server machine IP addresses—"10.18.22.19", "10.93.23.206", and "10.89.34.155").

In some instances, block 1304 is optional. For example, the traffic controller 110 may obtain the first list directly from the data logs without discarding the source ports from the data logs.

At block 1308, the traffic controller 110 classifies the IP addresses into an IP address class from a plurality of IP address classes. For example, specific IP ranges may be associated with specific classes such as a first class (e.g., Class A), a second class (e.g., Class B), a third class (e.g., Class C), and/or additional classes. For instance, the first class may be associated with private IP ranges (e.g., machines at a user's home) whereas the second and third classes may be associated with other types or categories of machines. Each of the classes may have a set IP address range (e.g., a range with an upper bound and a lower bound). The traffic controller 110 may classify the client machine IP addresses and/or the server machine IP addresses into the different classes based on comparing each of the IP addresses with the IP address ranges associated with the different classes.

For instance, in some variations, the Class A may be a public IP address range, which may be between from "1.0.0.0" to "127.0.0.0". Class B may also be a public IP address range, which may be from "128.0.0.0" to "191.255.0.0". Class C may also be another public IP address range, which may be from "192.0.0.0" to "223.255.255.0". Class D may be an IP address range from "224.0.0.0" to "239.255.255.255". Class E may also be a public IP address range, which may be from "240.0.0.0" to "255.255.255.255".

At block 1310, the traffic controller 110 generates octets for the client machine IP addresses on a merge algorithm. For example, after classifying the IP addresses (e.g., client machine IP addresses) into the different classes, the traffic controller 110 may use a merge algorithm to generate octets for the different classes. For instance, as mentioned above, each IP address may be associated with four octets (e.g., "a.b.c.d" where a, b, c, and d may be any number between 0 and 255). The traffic controller 110 may apply a "/8", "/16", "/24", and/or "/32" function to the IP addresses and generate four sets associated with these functions. For example, by applying "/8", the traffic controller 110 may determine whether the first octet, "a", is the same within the IP addresses for a particular class. In other words, the traffic controller 110 may analyze each octet of the IP address (e.g., compare the octet of the IP addresses), determine the similarities between the octets of the IP addresses (e.g., whether there are similar or the same values within each of the octets), and generate sets associated with the similarities. Afterwards, based on the similarities, the traffic controller 110 may generate the octets for the IP addresses. To put it another way, in an example, the traffic controller 110 may determine that a particular class (e.g., Class A) includes three client machine IP addresses (e.g., 10.28.15.8", "10.28.15.5", and "10.28.10.3"). Given that only the first two octets are the same for these three client machine IP addresses, the traffic controller 110 may determine the merged IP address as "10.28.0.0/16", which indicates an IP address range of "10.28.0.0" to "10.28.255.255". The traffic controller 110 may do the same for the other classes as well. As such, the traffic controller 110 may obtain a plurality of merged IP addresses (e.g., client machine IP address octets) for each of the classes.

In some instances, when there is an empty list of IP addresses and/or when the lists exceed the list size per class type threshold, then the traffic controller 110 may return a "0.0.0.0/0" as the octet list.

As described below, the IP address ranges and/or the IP address octets (e.g., the client machine IP address octets and/or the server machine IP address octets) may refer to the octets of the IP addresses from the data logs.

At block 1312, the traffic controller 110 generates a second list (e.g., octet port pair list) indicating the client machine IP address octets (e.g., the merged client machine IP addresses in an octet form) and the destination ports based on the first list. For instance, based on the first list, the traffic controller 110 may generate a second list. The second list indicates the merged client machine IP addresses in an octet form (e.g., client machine IP address octets determined from block 1310) and the destination ports. For example, referring to the two entries above from the first list (e.g., the first entry: "10.82.100.125", "22", ["10.242.14.28", "157.121.110.238"] and the second entry: "10.82.100.125", "88", ["10.18.22.19", "10.93.23.206", "10.89.34.155"]), the traffic controller 110 may determine the second list to also include two entries—a first entry: ("10.82.100.125/32", "22") and a second entry: ("10.82.100.125/32", "88"). In other words, based on the first list and generating the octets, the traffic controller 110 determines a second list comprising a plurality of entries. Each of the entries indicates a first element (e.g., a client machine IP address octet) and a second element (e.g., the destination port). To put it another way, each of the classes may include one or more entries within the second list. For instance, the first class (e.g., Class A) may include an entry for the client machine IP address octet and a destination port associated with the client machine IP address. If the first class's client machine IP address is associated with two destination ports (e.g., "22" and "88"), the second list may include two entries for the particular class (e.g., the two entries shown above).

At block 1314, the traffic controller 110 generates a third list based on grouping corresponding server machine IP addresses and the second list together. For instance, based on the first and second lists as well as block 1310, the traffic controller 110 generates a third list that groups the server machine IP addresses together with the octet port pairs (e.g., each of the entries for the second list). For example, as mentioned above, the second list may include two entries (e.g., a first entry: ("10.82.100.125/32", "22") and a second entry: ("10.82.100.125/32", "88")). The traffic controller 110 may group the associated server IP addresses from the first list with the two entries from the second list. As such, the traffic controller 110 may generate a second list with two entries—a first entry: ("10.82.100.125/32", "22"): {"10.242.14.28", "157.121.110.238"}, and a second entry: ("10.82.100.125/32", "88"): {"10.93.23.206", "10.18.22.19", "10.89.34.155"}. In other words, based on the first list, the second list, and generating the octets, the traffic controller 110 determines a third list comprising a plurality of entries. Each of the entries indicates a first element (e.g., the client machine IP address octets with the associated destination port) and a second element (e.g., a list of server IP addresses). To put it another way, the first element of the third list may be an entry from the second list, and the second element of the third list may be the server IP addresses associated with the entry from the second list. As such, the third list may indicate all of the entries from the second list (e.g., the entries of the client machine IP address octets for each of the different classes), and its corresponding server machine IP addresses that were used to communicate with the client machine IP address/destination port combination.

At block 1316, the traffic controller 110 generates a fourth list indicating the server machine IP address octets. For instance, based on the first, second, and/or third lists as well as block 1310, the traffic controller 110 generates a fourth list that indicates the octets for the server machine IP addresses. For instance, the third list may indicate two entries (e.g., a first entry: ("10.82.100.125/32", "22"): {"10.242.14.28", "157.121.110.238"}, and a second entry: ("10.82.100.125/32", "88"): {"10.93.23.206", "10.18.22.19", "10.89.34.155"}). The traffic controller 110 may generate a fourth list that indicates the octets for the second element (e.g., the list of server machine IP addresses). For example, the fourth list may include two entries—a first entry: ["10.242.14.28/32", "157.121.110.238/32"], and a second entry: ["10.93.23.0/24", "10.89.34.0/24", "10.18.22.0/24"]. In other words, based on the second element of the third list (e.g., the list of server machine IP addresses), the traffic controller 110 determines a fourth list that converts these IP addresses (e.g., the server machine IP addresses) into octet form such as by using the merge algorithm described above.

At block 1318, the traffic controller 110 generates a first dictionary data structure. The key of the first dictionary data structure indicates the server and client machine IP addresses, and the value indicates the destination ports. For example, based on the first, second, third, and/or fourth lists, the traffic controller 110 may generate a first dictionary data structure. The first dictionary data structure may include two separate elements—a key and a value. The key may indicate the octets for the server machine IP addresses (e.g., the server machine IP address octets) and the client machine IP addresses (e.g., the client machine IP address octets). The value may indicate the destination ports (e.g., the destination ports).

At block 1320, the traffic controller 110 generates a second dictionary data structure. The key of the second dictionary data structure indicates the server machine IP addresses and the destination ports, and the value indicates the client machine IP addresses. For instance, based on the first dictionary data structure, the traffic controller 110 generates a second dictionary data structure. The second dictionary data structure may include two separate elements—a key and a value. Here, the key and the value are changed from the first dictionary data structure. For instance, the key is now the server machine IP address octets and the destination ports, and the value is the client machine IP address octets.

At block 1322, the traffic controller 110 generates a third dictionary data structure. The key of the third dictionary data structure indicates the client machine IP addresses and the destination ports, and the value indicates the server machine IP addresses. For instance, based on the second dictionary data structure, the traffic controller 110 generates a third dictionary data structure. The third dictionary data structure may include two separate elements—a key and a value. Here, the key and the value are changed from the second dictionary data structure. For instance, the key is now the client machine IP address octets and the destination ports, and the value is the server machine IP address octets. The process then returns back to block 1204 of FIG. 12.

In some examples, blocks 1318 to 1322 may performed in any order. For example, in another instance, the traffic controller 110 may first perform block 1322 (e.g., generate a third dictionary structure from the first through fourth lists), then perform block 1320 (e.g., generate a second dictionary data structure from the third dictionary data structure), and finally perform block 1318 (e.g., generate a first dictionary data structure from the second dictionary data structure).

Returning back to FIG. 12, at block 1204, the traffic controller 110 determines one or more recent network traffic rules based on the one or more generated dictionary data structures (e.g., first, second, and/or third dictionary data structures from blocks 1318 to 1322). For instance, the traffic controller 110 may first determine intermediate recent network traffic rules based on the one or more of the dictionary data structures (e.g., the third dictionary data structure) and unpacking the corresponding IP address octets and/or ports in separate lists for each key in the dictionary data structure. For example, based on the third dictionary data structure, the traffic controller 110 may unpack the dictionary data structure to determine one or more intermediate recent network traffic rules. The one or more intermediate recent network traffic rules may indicate the one or more server machine IP address octets, the one or more destination ports, and the one or more client machine IP address octets from the third dictionary data structure. For example, each of the intermediate recent network traffic rules may include three elements—a first element for the corresponding client machine IP address octet, a second element for the one or more server machine IP address octets, and a third element for the destination port. In other words, as mentioned above, the third dictionary data structure may include keys that are the client machine IP addresses and the destination ports, and values that are the server machine IP addresses. The traffic controller 110 may unpack the information from the third dictionary data structure to generate the intermediate recent network traffic rules. For example, for each entry from the third dictionary data structure, the traffic controller 110 may unpack the client machine IP addresses (e.g., the client machine IP address octet), the server machine IP addresses (e.g., the server machine IP address octets), and the destination ports from the third dictionary data structure to generate the three elements of the intermediate recent network traffic rules. Therefore, for each class, the traffic controller 110 may determine one or more intermediate recent network traffic rules.

Then, based on the intermediate recent network traffic rules, the traffic controller 110 may determine the recent network traffic rules. For instance, the traffic controller 110 may determine the protocol (e.g., TCP or UDP) and/or the traffic direction (e.g., inbound or outbound direction) based on the data logs. Then, the traffic controller 110 may generate the recent network traffic rules based on including the protocol and traffic direction into the intermediate recent network traffic rules. As such, the recent network traffic rules may include two additional elements—a fourth element for the protocol (e.g., "T" for TCP and "U" for UDP) and a fifth element for the traffic direction (e.g., "O" for outbound traffic direction and "I" for inbound traffic direction").

At block 1206, the traffic controller 110 determines a new recommended network traffic rule based on security groups associated with the plurality of data logs and consolidating the one or more recent network traffic rules with historical proposed traffic rules. This will be described in more detail using FIGS. 14-16.

Figure 14:
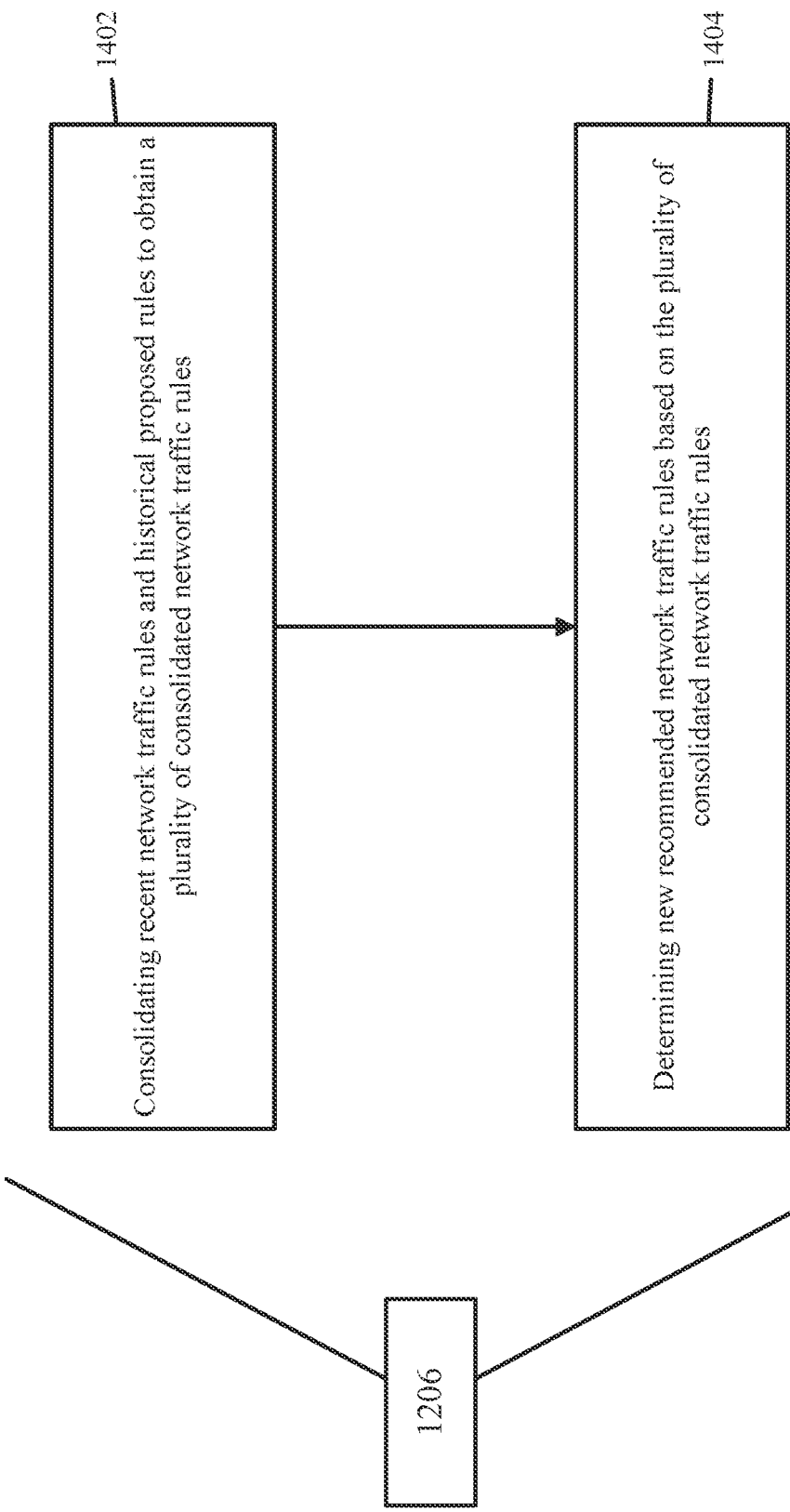
FIG. 14 is an exemplary process for determining new recommended network traffic rules in accordance with one or more examples of the present application.

FIG. 14 is an exemplary process for determining new recommended network traffic rules in accordance with one or more examples of the present application, and will be used to describe block 1206 of FIG. 12 in more detail. The process 1400 may be performed by the cloud computing platform 108 and/or the traffic controller 110 shown in FIGS. 1 and 3. It will be recognized that any of the following blocks may be performed in any suitable order, and that the process 1400 may be performed in any suitable environment. The descriptions, illustrations, and processes are merely exemplary and the process 1400 may use other descriptions, illustrations, and processes for determining new recommended network traffic rules. Further, process 1400 may describe an exemplary implementation of block 1206 of process 1200, but in other examples, the traffic controller 110 may use other implementations to determine new recommended network traffic rules.

Figure 15:
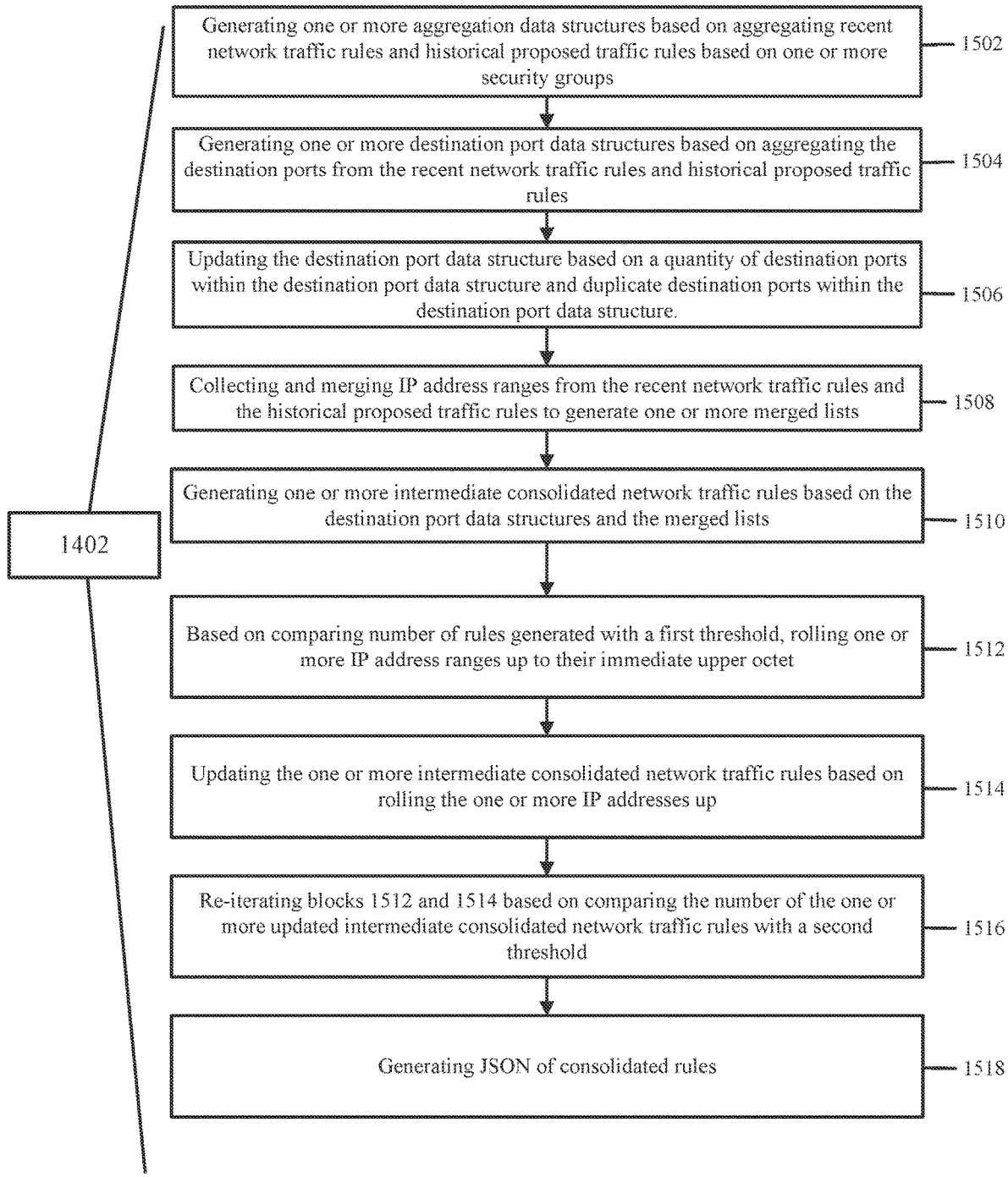
FIG. 15 is an exemplary process for consolidating recent network traffic rules and historical proposed rules to obtain consolidated network traffic rules in accordance with one or more examples of the present application.
Figure 16:
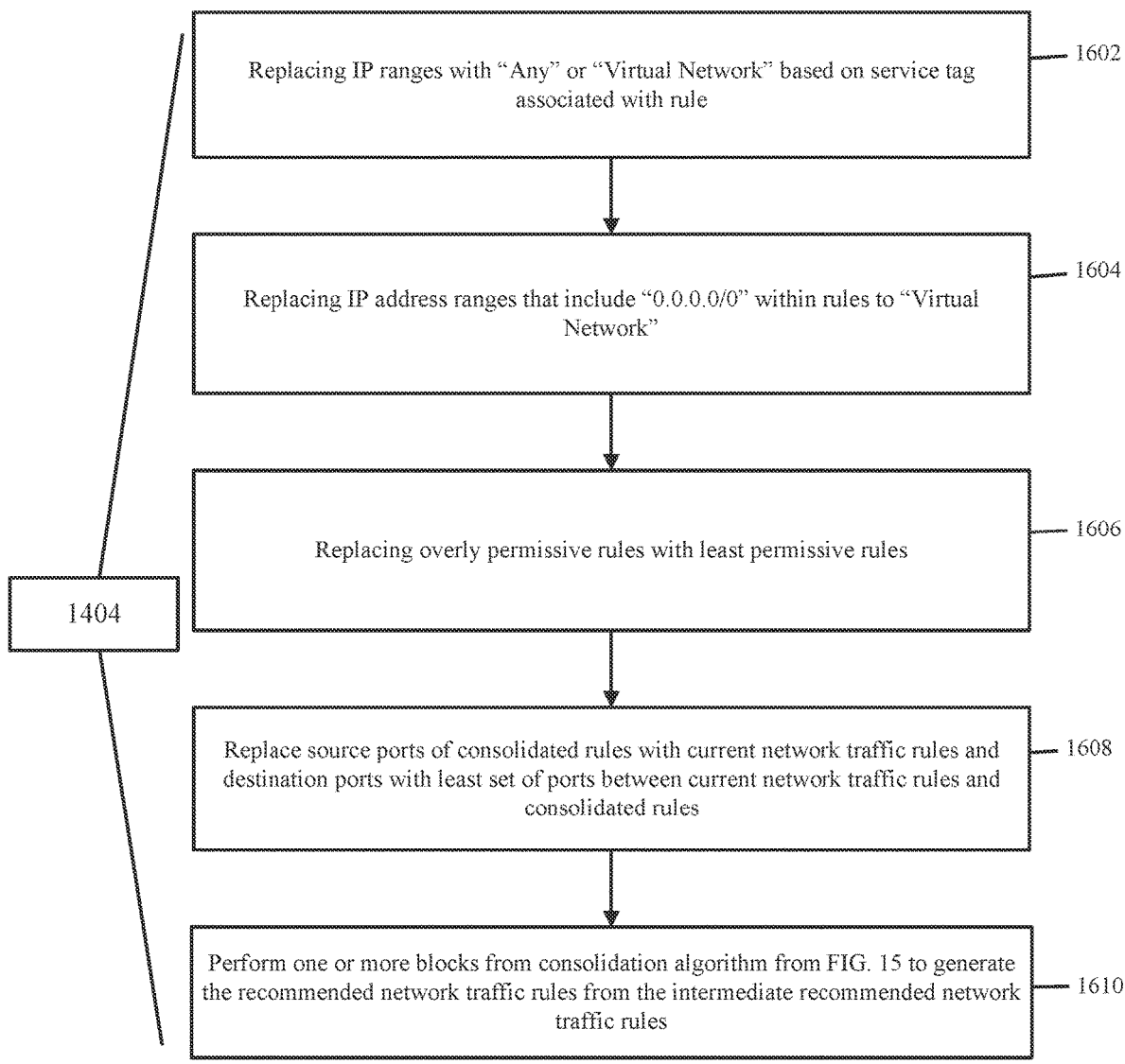
FIG. 16 is an exemplary process for determining new recommended network traffic rules in accordance with one or more examples of the present application.

At block 1402, the traffic controller 110 consolidates recent network traffic rules (e.g., the recent network traffic rules determined at block 1204) and historical proposed rules to obtain a plurality of consolidated network traffic rules. At block 1404, the traffic controller 110 determines new recommended network traffic rules based on the plurality of consolidated network traffic rules. FIGS. 15 and 16 will describe blocks 1402 and 1404 in more detail. The processes shown in FIGS. 15 and 16 may describe an exemplary implementation of blocks 1402 and 1404 of process 1400, but in other examples, the traffic controller 110 may use other implementations to obtain the plurality of consolidated network traffic rules and/or determine the new recommended network traffic rules.

Referring to FIG. 15, at block 1502, the traffic controller 110 generates one or more aggregation data structures based on aggregating the recent network traffic rules and the historical proposed traffic rules based on one or more security groups. For example, the security groups may be associated with a textual indicator and/or another identifying feature that identifies a set of rules. Each security group may be associated with a plurality of rules (e.g., current network traffic rules). For example, the security groups may include one or more arrays indicating client machine IP addresses (e.g., source IP addresses)/client machine IP address octets, server machine IP addresses (e.g., destination IP addresses)/server machine IP address octets, and destination ports for a particular source port, protocol, and/or traffic direction.

For example, as mentioned previously, the traffic controller 110 may periodically generate network traffic rules based on the data logs over a time period (e.g., periodically perform the process shown in FIG. 13). For instance, each day, the traffic controller 110 may generate network traffic rules and store the network traffic rules in a database. Within the database, the most recently generated network traffic rules (e.g., most recently stored network traffic rules) may be the recent network traffic rules and the other stored network traffic rules (e.g., the traffic rules for the previous six months) may be the historical proposed traffic rules. At block 1502, the traffic controller 110 may generate one or more data structures that aggregates these rules based on the security group. The data structure may include a plurality of entries, and each entry may indicate a recent network traffic rule or a historical proposed traffic rule. As described above, the recent network traffic rules and the historical proposed traffic rules may indicate the client/server IP addresses (e.g., the client/server IP address octets that include the four octets and a function such as "/16"), the destination ports, the protocol, and/or the traffic direction. Further, the recent network traffic rules and the historical proposed traffic rules may also indicate the network security group and/or rule name (e.g., a rule name associated with a current network traffic rule that is currently being applied). Therefore, at block 1502, the traffic controller 110 may generate a data structure (e.g., array) that comprises all of the recent network traffic rules and historical proposed traffic rules for a particular security group and/or a particular current network traffic rule.

In some examples, the traffic controller 110 may generate aggregation data structures for each of the different security groups and/or current network traffic rules. For instance, the traffic controller 110 may generate a first aggregation data structure for a first security group and a first current network traffic rule, a second aggregation data structure for a second security group and a second network traffic rule, and so on. Each of the aggregation data structures may include a plurality of rules (e.g., recent and historical traffic rules). The traffic controller 110 may perform blocks 1504-1516 for each of the different aggregation data structures. For instance, the traffic controller 110 may consolidate the rules within each of the aggregation data structures until the total number of rules is below a certain threshold (e.g., the first threshold such as five).

At block 1504, the traffic controller 110 generates one or more destination port data structures based on aggregating the destination ports from the recent network traffic rules and the historical proposed traffic rules. For instance, for a given security group and current network traffic rule (e.g., for a given aggregation data structure), the traffic controller 110 may determine all of the destination ports associated with the security group, current network traffic rule, server/client machine IP address ranges (e.g., the server/client machine IP address octets), protocol, and traffic direction. The traffic controller 110 may include the determined destination ports into a destination port data structure. In other words, for each security group, current network traffic rule, server machine IP address range (e.g., server machine IP address octet), client machine IP address range (e.g., client machine IP address octet), protocol, and traffic direction, the traffic controller 110 may determine the associated destination ports, and store the associated destination ports into a destination port data structure.

For instance, in some variations, the traffic controller 110 may determine a single client machine IP address octet and a single server machine IP address octet from the IP address octets from the aggregation data structure(s). The traffic controller 110 may determine all of the destination ports from the recent network traffic rules and the historical proposed traffic rules for the single client machine IP address octet and the single server machine IP address octet. The traffic controller 110 may generate a destination port data structure, and each entry within the destination port data structure may indicate the single client machine IP address octet, the single server machine IP address octet, and the destination ports associated with the IP address octets. Additionally, and/or alternatively, the traffic controller 110 may generate a different destination port data structure for each security group, protocol, and/or traffic direction. Each of entry from the different destination port data structures may include a single client machine IP address octet, a single server machine IP address octet, and the destination ports associated with the IP address octets. In some examples, as mentioned above, due to a merging algorithm, the IP address octets may include multiple different IP addresses. As such, each entry within the destination port data structure may include one client/server machine IP address octet, but the one client/server machine IP address octet may represent multiple different actual IP addresses that were used by the client and/or server machines.

At block 1506, the traffic controller 110 updates the destination port data structure based on a quantity of destination ports within the destination port data structure and duplicate destination ports within the destination port data structure. For instance, the traffic controller 110 may compare the number of destination ports within the destination port data structure (e.g., number of destination ports within each entry from the destination port data structure) with a threshold (e.g., ten). Based on the comparison, the traffic controller 110 may change the observed destination ports to "Any", which may allow the interaction between the client IP address and the server IP address for a given protocol and traffic direction to be any destination port. In other words, if the traffic controller 110 determines that numerous destination ports (e.g., ten or more destination ports) were used between the client and server IP addresses (e.g., the client/server machine IP address octet), the traffic controller 110 may change the destination ports from actual numerical values (e.g., "22" or "80") to "Any", which indicates that any destination port may be used.

Additionally, and/or alternatively, the traffic controller 110 may check whether any of the client machine IP address octets (e.g., client machine IP address octets within an aggregation data structure and/or the destination port data structure) are super net client IP address octets. A super net IP address octet (e.g., a super net client IP address octet or a super net server IP address octet) may be an IP address range that incorporates another merged IP address range within it. For example, if two rules (e.g., a recent network traffic rule and a historical proposed rule) are associated with two IP address octets (e.g., client IP address octets such as "10.1.1.0/24" and "10.1.0.0/16"), the traffic controller 110 may check whether the IP address octet is a super net IP address octet. For instance, in the above example, the client IP address octet "10.1.1.0/24" would be within the range associated the client IP address octet "10.1.0.0/16". As such, the traffic controller 110 may determine that the IP address octet "10.1.1.0/24" would be a sub net IP address and that the IP address octet "10.1.0.0/16" would be a super net IP address octet. To determine the super/sub net client IP address octets, the traffic controller 110 may further determine that the two IP address octets (e.g., "10.1.1.0/24" and "10.1.0.0/16") are communicating to the same server machine IP address (e.g., the same server machine IP address octet), using the same protocol, and in the same direction. Based on determining the super net IP address octet, the traffic controller 110 may combine the destination ports associated with the two IP address octets (e.g., the super and sub net IP address octets) and remove duplicates. For instance, in some examples, the traffic controller 110 may combine the two entries within the destination port data structure (e.g., the entries for the super and sub net IP address octets such as a super net client machine address octet and a sub net client machine address octet). Thus, the new combined entry would include the super net client machine IP address octet, the server machine IP address octet, and the combined destination ports from the previous two entries.

For example, as mentioned previously, the traffic controller 110 may apply a "/8", "/16", "/24", and/or "/32" function to the IP addresses (e.g., the client machine IP addresses) when performing the merge algorithm to generate the octets for the IP addresses. Each of these functions may indicate an IP address range (e.g., for "10.28.0.0/16", based on the "/16", the traffic controller 110 may determine an IP address range from "10.28.0.0" to "10.28.255.255"). The traffic controller 110 may determine whether one of the client IP address ranges (e.g., client IP address octets) is within the range of another one of the client IP address ranges. If so, the traffic controller 110 may determine the broader range as the super net client IP address range, consolidate the two ranges together, and delete any duplicates. For instance, the traffic controller 110 may determine two network traffic rules as: First Rule—"source": "10.1.1.0/24", "destination": "100.1.8.0/24", "protocol": "T", "direction": "I", "ports": ["22", "80"], and Second Rule—"source": "10.1.0.0/16", "destination": "100.1.8.0/24", "protocol": "T", "direction": "I", "ports": ["80", "443"]. The "source" indicates the client IP address range, the "destination" indicates the server IP address range, the "protocol" indicates the protocol used for the communication, the "direction" indicates the traffic direction, and the "ports" indicate the destination ports. As shown, the client IP address range "10.1.1.0/24" for the first rule is within the client IP address range "10.1.0.0/16" for the second rule. As such, the client IP address range "10.1.0.0/16" is a super net client IP address range (e.g., super net client IP address octet). The traffic controller 110 may merge these two rules such that the "source" (e.g., the client IP address range) is the super net client IP address range (e.g., "10.1.0.0/16") and the destination ports are merged together (e.g., "22", "80", "80", and "443"). Further, since there is a duplicate destination port (e.g., "80"), the traffic controller 110 may remove the duplicate destination port. As such, the consolidated entry within the destination port data structure would indicate "source": "10.1.0.0/16", "destination": "100.1.8.0/24", "protocol": "T", "direction": "I", "ports": ["22", "80", "443"]. Additionally, and/or alternatively, the traffic controller 110 may check whether any of the server machine IP address octets (e.g., server machine IP address octets within an aggregation data structure and/or the destination port data structure) are super net server IP address octets. If so, the traffic controller 110 may perform the same functionality as described above to merge the server machine IP address octets, and remove duplicate destination ports.

At block 1508, the traffic controller 110 collects and merges the IP address ranges from the recent network traffic rules and the historical proposed traffic rules to generate one or more merged lists (e.g., merged data structures). For instance, the aggregation data structure may indicate the aggregated rules with the client and server IP address octets. The traffic controller 110 may analyze the client and server IP address octets and determine whether any of these can be further merged. The traffic controller 110 may first perform this for the client IP address octets, and then perform this for the server IP address octets. For example, for the client IP address octets, the traffic controller 110 may determine client IP address octets for a particular server IP address octet, port, protocol, and traffic direction that are the same. The traffic controller 110 may determine whether these client IP address octets can be merged. For instance, the traffic controller 110 may check whether these client IP address octets can be merged based on the functions described above (e.g., the "/8", "/16", "/24", and/or "/32" functions). After, the traffic controller 110 may generate one or more lists based on the functions and/or the merger, delete any duplicates, and output the remaining octets of the client IP addresses as one list.

For example, in some instances, the traffic controller 110 may determine the client machine IP address octets for a particular server machine IP address octet and a particular port. The traffic controller 110 may determine whether any of these client machine IP address octets can be merged. After, the traffic controller 110 may generate a list indicating a plurality of entries. Each of the entries would include the particular server machine IP address octet, the particular port (e.g., destination port), and one or more client machine IP address octets, which may or may not have been merged.

For instance, initially, the traffic controller 110 may seek to merge these IP address octets using the "/8", "/16", "/24", and/or "/32" functions and checking the similarities between each of the IP address octets within the group (e.g., the client IP address octets that have the same server IP address/ address octet, port, protocol, and traffic direction). For example, if the IP address ranges within the group are "10.1.2.1/32" and "10.1.2.2/32", the traffic controller 110 may return ["10.1.2.0/24"]. But, if the IP address ranges for the group are "10.1.2.1/32", "10.1.2.2/32", "10.1.3.1/32", and "10.1.3.2/32", the traffic controller 110 returns ["10.1.2.0/24", "10.1.3.0/24"] for the "/24" function.

Similarly, the traffic controller 110 may continuously perform the merging algorithm to merge the IP address ranges to the highest octet level available. For instance, regarding the above example, the traffic controller 110 may take it one step further using the "/16" function and merge the two IP addresses to "10.1.0.0/16". In another example, for the "/16" function, given ["10.1.2.1/32", "10.1.2.2/32", "10.1.3.1/32", "10.1.3.2/32", "10.1.13.1/32", "10.1.13.2/32"], the traffic controller 110 returns ["10.1.0.0/16"]. In yet another example, for the "/8" function, ["10.1.2.1/32", "10.1.2.2/32", "10.1.3.1/32", "10.1.3.2/32", "10.1.11.1/32", "10.1.11.2/32", "10.2.2.1/32", "10.2.2.2/32", "10.2.3.1/32", "10.2.3.2/32", "10.2.11.1/32", "10.2.11.2/32", "10.11.2.1/32", "10.11.2.2/32", "10.11.3.1/32", "10.11.3.2/32", "10.11.11.1/32", "10.11.11.2/32"], the traffic controller 110 returns ["10.0.0.0/8"]. In some examples, if the IP address range is empty (e.g., there are no IP addresses for a group), the traffic controller 110 returns "0.0.0.0/0".

Afterwards, the traffic controller 110 determines the unique IP address ranges from the different lists (e.g., first list associated with the function "/32", second list associated with the function "/24", third list associated with "/16", fourth list with "/8", and/or a fifth list with "/0") and may remove duplicates.

Then, the traffic controller 110 determines and removes any subnet IP address octets from the different lists. For instance, starting with the fourth list, the traffic controller moves any subset in the first through third lists. For example, if the fourth list indicates the IP address range "10.0.0.0/8" and third list indicates the IP address range "10.2.0.0/16", the traffic controller 110 may determine the IP address range "10.2.0.0/16" is a subnet as it is included within the IP address range "10.0.0.0/8", and the traffic controller 110 may remove the IP address range "10.2.0.0/16" from the third list. The traffic controller 110 may perform the same process for the other lists. For instance, if the third list includes the IP address range "12.2.0.0/16" and the second list includes the IP address range "12.2.1.0/24", the traffic controller 110 may determine "12.2.1.0/24" as a subnet and remove it from the second list. Similarly, if the second list includes the IP address range "14.2.1.0/24" and the first list includes the IP address range "14.2.1.2/32", the traffic controller 110 may determine the IP address range "14.2.1.2/32" is a subnet and remove it from the first list.

Afterwards, the traffic controller 110 may return all of the remaining octets (e.g., from the first through fifth lists) as a singular list. The singular list (e.g., a merged list) may include a plurality of entries, and each entry may include a particular server machine IP address octet, a particular port (e.g., destination port), and one or more client machine IP address octets, which may or may not have been merged.

After completing the merging for the client IP address octets, the traffic controller 110 may perform the same process described above for the server IP address octets. For instance, the traffic controller 110 may determine server IP address octets within the aggregated rules that have the same client IP addresses/address octets, ports, protocols, and/or traffic direction, and merge them together. As such, after completing block 1508, the traffic controller 110 may determine a destination port data structure with a plurality of entries, and each entry includes a singular client IP address octet, a singular server machine IP address octet, and one or more destination ports. The traffic controller 110 may further determine two merged lists—a client machine IP address octet list and a server machine IP address octet list. The client machine IP address octet list may include a plurality of entries, and each entry includes a singular server machine IP address octet, a singular destination port, and one or more client machine IP address octets. The server machine IP address octet list may include a plurality of entries, and each entry includes a singular client machine IP address octet, a singular destination port, and one or more server machine IP address octets.

At block 1510, the traffic controller 110 generates one or more intermediate consolidated network traffic rules based on the destination port data structures and the merged lists (e.g., the client machine IP address octet list and the server machine IP address octet list, which may be client/server machine IP address octet data structures). For example, the traffic controller 110 generates one or more intermediate consolidated network traffic rules, and each of the intermediate consolidated network traffic rules may indicate an entry from the destination port data structure, the client machine IP address octet list, and/or the server machine IP address octet list. In other words, each intermediate consolidated network traffic rule may indicate at least three elements (e.g., destination port, server machine IP address octet, and client machine IP address octet). Further, each intermediate consolidated network traffic rule may indicate only a single value in the first element (e.g., a single destination port), a single value in the second element (e.g., a single server machine IP address octet), and one or more values of the third element (e.g., one or more client machine IP address octets). For example, each entry from the destination port data structure and the merged lists include two elements that have only a single value, and a third element that may have one or more values. For instance, for the destination port data structure, each entry includes a single client machine IP address octet and a single server machine IP address octet, but may have one or more destination ports. Similarly, the client machine IP address octet list has entries with a single server machine IP address octet and a single destination port, but may have one or more client machine IP address octets. Likewise, the server machine IP address octet list has entries with a single client machine IP address octet and a single destination port, but may have one or more server machine IP address octets. In some variations, the traffic controller 110 may update the aggregation data structures based on the intermediate consolidated network traffic rules (e.g., replace the previous entries of the aggregation data structures with the new intermediate consolidated network traffic rules).

At block 1512, based on comparing the number of rules generated at block 1510 with a first threshold, the traffic controller 110 rolls one or more IP address ranges up to their immediate upper octet. At block 1514, the traffic controller 110 updates the one or more intermediate consolidated network traffic rules based on rolling the one or more IP addresses up. For instance, the first threshold may be pre-defined and/or set by a user (e.g., the traffic controller 110 may receive user input indicating the first threshold such as five). The traffic controller 110 may compare the number of generated rules from block 1510 with a first threshold (e.g., five). Based on the number of generated rules exceeding the first threshold, the traffic controller 110 may roll up the client and/or server IP address ranges to their immediate upper octet. For example, if the intermediate consolidated network traffic rule indicates an IP address of "10.1.2.0/24" and the number of generated intermediate consolidated network traffic rules is greater than the first threshold, the traffic controller 110 may roll the IP address to its immediate upper octet (e.g., "10.1.0.0/16") and update the intermediate consolidated network traffic rules with the new IP address. The traffic controller 110 may do this for each of the determined intermediate consolidated network traffic rules within the security group.

Additionally, and/or alternatively, the traffic controller 110 may update the intermediate consolidated network traffic rules by deleting duplicates. For example, two separate rules may have the IP address octets of "10.1.2.0/24" and "10.1.15.0/24". The traffic controller 110 may roll up these IP address octets to their immediate upper octet, which would be "10.1.0.0/16" and "10.1.0.0/16" for both rules. Because they would have the same IP address octets now, the traffic controller 110 may remove one of these rules as it is a duplicate (e.g., by combining the entries and deleting the duplicates as described above). Additionally, and/or alternatively, the traffic controller 110 may update the intermediate consolidated network traffic rules by performing blocks 1504-1510 again with the newly rolled up IP address octets. For example, for the newly updated intermediate consolidated network traffic rules, the traffic controller 110 may aggregate the destination ports, update the destination port data structures, collect and merge the IP address ranges (e.g., generate new merged lists), and generate new intermediate consolidated network traffic rules.

At block 1516, the traffic controller 110 re-iterates blocks 1512 and 1514 based on comparing the number of the one or more updated intermediate consolidated network traffic rules with a second threshold. For instance, the second threshold (e.g., pre-defined and/or user-defined) may be similar or different from the first threshold (e.g., five). The traffic controller 110 may compare the updated intermediate consolidated network traffic rules with this second threshold. If the updated intermediate consolidated network traffic rules exceeds the second threshold, the traffic controller 110 may repeat blocks 1512 and 1514 to reduce the number of intermediate consolidated network traffic rules. If the updated intermediate consolidated network traffic rules does not exceed the second threshold, the process may move to block 1518.

In other words, referring to blocks 1504-1516, the traffic controller 110 may reduce the number of network traffic rules for a given security group and/or a given current network traffic rule to be within one or more thresholds. For example, after the aggregation at block 1502, the aggregation data structure may include a plurality of recent network traffic rules and historical proposed traffic rules (e.g., fifteen rules) for a particular security group and/or for a particular current network traffic rule. The traffic controller 110 may perform blocks 1504-1510 to reduce the number of rules within the aggregation data structure. For example, for blocks 1504 and 1506, the traffic controller 110 may determine network traffic rules that have the same client/server machine IP address octets, protocol, and traffic direction. The traffic controller 110 may aggregate the destination ports for these network traffic rules into a single network traffic rule, and remove the duplicate ports. Further, the traffic controller 110 may determine whether the client machine IP address octets are super net client machine IP address octets with one or more sub net client machine IP address octets. For these, the traffic controller 110 may further aggregate the destination ports for the super/sub net client machine IP address octets, and update the rules accordingly (e.g., have one rule with the super net client machine IP address octet, the server machine IP address octet, the aggregated destination ports, the protocol, and the traffic direction). Thus, based on the super/sub net client machine IP address octets as well as aggregating the destination ports, the traffic controller 110 may consolidate and/or reduce the total number of rules within the aggregation data structure.

For block 1508, the traffic controller 110 may merge the IP address ranges such as by merging the client machine IP address octets and the server machine IP address octets. For instance, based on the server machine IP address octet, destination port, protocol, and traffic direction matching for particular entries within the aggregation data structure, the traffic controller 110 may merge the client machine IP address octets associated with the particular entries using the merge algorithm. Similarly, based on the client machine IP address octet, destination port, protocol, and traffic direction matching for particular entries within the aggregation data structure, the traffic controller 110 may merge the server machine IP address octets associated with the particular entries using the merge algorithm. As such, the traffic controller 110 may further reduce the number of rules within the aggregation data structure. At block 1510, the traffic controller 110 generates the one or more intermediate consolidated network traffic rules. The one or more intermediate consolidated network traffic rules may indicate the rules that have been updated within the aggregation data structure.

For block 1512, the number of rules within the aggregation data structure may still exceed a certain threshold (e.g., five). For example, based on performing blocks 1504-1508, the traffic controller 110 may have reduced the number of rules from fifteen to ten. As such, the traffic controller 110 may perform block 1512 that rolls up one or more IP address ranges up to their immediate upper octet. For example, for the remaining ten rules, the traffic controller 110 may roll up the IP address ranges for its client/server machine IP address octets to its immediate upper octet (e.g., for the IP address "10.1.2.0/24", the traffic controller 110 may roll it up to "10.1.0.0/16"). Afterwards, the traffic controller 110 may update the aggregation data structure such as by deleting any duplicates caused by rolling up the IP addresses up to its immediate upper octet. Further, the traffic controller 110 may perform blocks 1504-1508 again based on the new IP address octets (e.g., the IP address octets that have been rolled up to its immediate upper octet). As such, the traffic controller 110 may further reduce the number of rules within the aggregation data structure. Subsequently, at block 1516, the traffic controller 110 may check again to see whether the number of rules within the aggregation data structure is within a threshold (e.g., below five rules). If so, the traffic controller 110 may perform block 1518. Otherwise, the traffic controller 110 may reiterate blocks 1512 and 1514 (e.g., roll up the IP address octets to its immediate upper octet and update the intermediate consolidated network traffic rules) until the number of rules within the aggregation data structure is within the threshold.

At block 1518, the traffic controller 110 generates a JAVASCRIPT Object Notation (JSON) of the consolidated rules. The JSON may indicate the security group, the current network traffic rule, and the collection of consolidated rules (e.g., the client/server IP address ranges, the destination ports, the source ports, the protocol, and/or the traffic direction).

Referring to FIG. 16, FIG. 16 describes block 1404 in more detail. At block 1602, the traffic controller 110 replaces IP ranges with "Any" or "Virtual Network" based on service tags associated with rule (e.g., current network traffic rules). At block 1604, the traffic controller 110 replaces IP address ranges that include "0.0.0.0/0" within the rules (e.g., the consolidated rules) to "Virtual Network". For instance, certain current network traffic rules may have service tags such as "Load Balancer" or "Intranet". In other words, when creating a rule in certain cloud networks, an operator may select a "service" and call them using a service tag (e.g., service tags associated with a list of services). As such, the traffic controller 110 might not want to update these current network traffic rules and may replace the IP address ranges from the consolidated rules as "Any" or "Virtual Network".

For example, based on process 1500, the traffic controller 110 may generate a plurality of consolidated network traffic rules. The traffic controller 110 may compare the consolidated network traffic rules with the current network traffic rules, and determine intermediate recommended network traffic rules based on the comparison. For instance, the traffic controller 110 may seek to restrict the overly permissive nature of the consolidated network traffic rules, improve the user experience by including service tags, and/or ensure that the consolidated network traffic rules are not overly restrictive.

To do this, at block 1602, the traffic controller 110 may determine service tags associated with the rules. For example, instead of having an IP address range (e.g., IP address octet), the current network traffic rule may include service tags such as "Virtual Network", "Any", or "Load Balancer". Based on the comparison (e.g., comparison of service tag and the IP address octet(s) from the consolidated network traffic rules), the traffic controller 110 may generate intermediate recommended network traffic rules. For example, based on the consolidated network traffic rule (e.g., the client machine IP address octet) indicating "0.0.0.0/0" and the current network traffic rule indicating the service tag "Virtual Network", the traffic controller 110 may keep the current network traffic rule the same (e.g., generate the intermediate recommended network traffic rule as "Virtual Network"). In some instances, based on the consolidated network traffic rule indicating a more permissive IP address octet (e.g., "10.30.0.0/16") when compared to the service tag of the current network traffic rule (e.g., "Virtual Network"), the traffic controller 110 may replace the current network traffic rule with the consolidated network traffic rule (e.g., generate the intermediate recommended network traffic rule to indicate an IP address octet of "10.30.0.0/16". In another instance, based on the consolidated network traffic rule indicating a less permissive IP address octet (e.g., "10.30.0.0/16") when compared to another service tag of the current network rule (e.g., "Load Balancer"), the traffic controller 110 may keep the current network traffic rule the same (e.g., generate the intermediate recommended network traffic rule as "Load Balancer").

At block 1606, the traffic controller 110 replaces overly permissive rules with least permissive rules. For example, based on comparing the current network traffic rules with the consolidated network traffic rules, the traffic controller 110 may replace the overly permissive rules with least permissive rules. For instance, if the current network traffic rule is "10.2.3.2/32" while the IP address ranges in any of the consolidated rules for the same security group and its rule includes "10.2.3.0/24", then the consolidated rules will be replaced with "10.2.3.2/32" in the respective consolidated rules. In another example, if the current network traffic rule is "10.30.18.0/24" and the consolidated network traffic rule indicates "10.30.0.0/16", then the traffic controller 110 may keep the current network traffic rule (e.g., generate the intermediate recommended network traffic rule as "10.30.18.0/24").

At block 1608, the traffic controller 110 replaces the source ports of the consolidated rules with those of the current network traffic rules and the destination ports with the least set of ports between the current network traffic rules and the consolidated network traffic rules. For example, based on the consolidated rules including fewer indicated destination or source ports than the current network traffic rules, the traffic controller 110 may replace the destination or source ports from the current network traffic rules with the destination or source ports from the consolidated rules. For example, the current rules may indicate "any" for the source ports and the destination ports may indicate "3030", "40", and "50". For the consolidated rules, the source ports may indicate "any" and the destination ports may indicate only "40". As such, given that the destination ports of the consolidated rules include fewer ports (e.g., only "40") than the current network traffic rules, the traffic controller 110 may generate an intermediate recommended network traffic rule with the fewer ports (e.g., only "40"). Given that the source ports are the same (e.g., "any"), the traffic controller 110 may keep the current rules as the recommended network traffic rule.

At block 1610, the traffic controller 110 performs one or more blocks from the consolidation algorithm from FIG. 15 (e.g., blocks 1504 through 1510) to generate the recommended network traffic rules from the intermediate recommended rules. For example, as mentioned previously, the traffic controller 110 may perform the merge algorithm, determine super/sub net IP address octets, and/or determine duplicates within the intermediate recommended rules. For example, as mentioned above in block 1504 and 1506, the traffic controller 110 may determine whether any of the IP address octets from the intermediate recommended rules are super/sub net IP address octets. Based on determining that one or more of them are, the traffic controller 110 may merge or combine the intermediate recommended rules together to generate the recommended network traffic rule. For instance, based on determining that a client machine IP address octet for a first intermediate recommended network traffic rule is a super net IP address octet to another client machine IP address octet for a second intermediate recommended network traffic rule, the traffic controller 110 may generate a recommended network traffic rule that includes only the client machine IP address octet from the first intermediate recommended network traffic rule. Additionally, and/or alternatively, the traffic controller 110 may combine the destination ports, source ports, and/or the server machine IP address octets from the first and second intermediate recommended network traffic rules, and/or may further remove duplicates (e.g., duplicate destination ports/source ports). As such, the recommended network traffic rule may include the client machine IP address octet from the first intermediate recommended network traffic rule as well as the combined destination ports, source ports, and/or the server machine IP address octets. Additionally, and/or alternatively, the traffic controller 110 may collect and/or merge the IP address ranges for the intermediate recommended network traffic rules as described by block 1508 to generate the recommended network traffic rules. For example, based on the destination ports and server machine IP address octets matching between two intermediate recommended network traffic rules, the traffic controller 110 may perform the merge algorithm described above to merge the two client machine IP address octets from the two intermediate recommended network traffic rules. The traffic controller 110 may generate the recommended network traffic rule based on the merger (e.g., the recommended network traffic rule may indicate the merged client machine IP address octet as well as the destination ports and server machine IP address octets from the two intermediate recommended network traffic rules).

As such, based on performing blocks 1602-1610, the traffic controller may generate the recommended network traffic rules based on the consolidated network traffic rules from process 1500.

Returning back to FIG. 12, at block 1208, the traffic controller 110 applies the new recommended network traffic rule to the network data transferred between a server machine and one or more client machines. For instance, the traffic controller 110 may perform block 1208 similarly to block 708 described above. In some examples, the traffic controller 110 may assign priority for to the new recommended network traffic rules and/or the current network traffic rules (e.g., the rules that did not change based on performing processes 1200-1600). For instance, in some variations, the traffic controller 110 assigns priority by reading the priority from the current network traffic rule (e.g., "p") and assigning the priority to each of the final recommended network traffic rules starting from "p+1" and incrementing by 1 for others. By doing this, the traffic controller 110 ensures that priorities of the recommended network traffic rules do not overlap across different recommended network traffic rules for a given security group. In other words, for performing block 1208 and routing traffic between a server machine and client machines, the traffic controller 110 may apply one or more rules (e.g., the newly determined recommended network traffic rules). Multiple rules (e.g., the current and recommended network traffic rules) may apply to route the traffic. To avoid overlap of the rules, the traffic controller 110 may use the priorities associated with the rules. For instance, based on the rule indicating top priority (e.g., "p" or the current network traffic rule) being applied to be applied to the traffic, the traffic controller 110 may use the rule indicating the top priority. If the top priority rule does not apply, then the traffic controller 110 may check whether the second highest priority rule (e.g., "p+1") would apply and use that rule if it applies.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for generating security rules for a cloud environment, comprising:
   generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports;
   determining one or more recent network traffic rules based on the one or more generated dictionary data structures;
   determining a new recommended network traffic rule based on one or more security groups associated with the plurality of data logs and consolidating the one or more recent network traffic rules with historical proposed traffic rules; and
   applying the new recommended network traffic rule to network data transferred between a server machine and one or more client machines.

2. The method of claim 1, wherein generating the one or more dictionary data structures is based on obtaining a first list, and wherein the method further comprises:
   obtaining the first list based on extracting the plurality of server machine IP addresses, the plurality of client machine IP addresses, and the plurality of destination ports from the plurality of data logs.

3. The method of claim 2, wherein obtaining the first list comprises:
   populating a first field of the first list with the plurality of server machine IP addresses;
   populating a second field of the first list with the plurality of client machine IP addresses;
   populating a third field of the first list with the plurality of destination ports from the plurality of data logs; and
   discarding a plurality of source ports from the plurality of data logs.

4. The method of claim 2, further comprising:
   classifying the plurality of server machine IP addresses and/or the plurality of client machine IP addresses into an IP address class from a plurality of IP address classes; and
   based on classifying the plurality of server machine IP addresses and/or the plurality of client machine IP addresses, generating octets for the plurality of client machine IP addresses, wherein generating the one or more dictionary data structures is based on generating the octets.

5. The method of claim 2, further comprising:
   generating a second list based on the first list, wherein the second list comprises a plurality of first entries and each of the first entries indicates a client machine IP address octet and one or more destination ports associated with the client machine IP address octet;
   generating a third list based on the first list and the second list, wherein the third list comprises a plurality of second entries and each of the second entries indicates one or more server machine IP addresses and a combination of the client machine IP address octet and the one or more destination ports; and
   generating octets for the one or more server machine IP addresses from the third list, wherein generating the one or more dictionary data structures is based on the second list, the third list, and the octets for the one or more server machine IP addresses.

6. The method of claim 1, wherein generating the one or more dictionary data structures comprises generating a first, a second, and a third dictionary data structure,
   wherein the key of the first dictionary data structure indicates first IP address octets associated with the server machine IP addresses and second IP address octets associated with the client machine IP addresses, wherein the value of the first dictionary data structure indicates destination ports from the plurality of destination ports,
   wherein the key of the second dictionary data structure indicates the first IP address octets associated with the server machine IP addresses and the destination ports, wherein the value of the second dictionary data structure indicates the second IP address octets associated with the client machine IP addresses, and
   wherein the key of the third dictionary data structure indicates the second IP address octets associated with the client machine IP addresses and the destination ports, wherein the value of the third dictionary data structure indicates the first IP address octets associated with the server machine IP addresses.

7. The method of claim 6, wherein generating the first, the second, and the third dictionary data structure comprises:
   generating the first dictionary data structure based on the plurality of data logs;
   generating the second dictionary data structure based on the first dictionary data structure; and
   generating the third dictionary data structure based on the second dictionary data structure.

8. The method of claim 6, wherein determining the one or more recent network traffic rules comprises:
   generating one or more intermediate rules based on using the key of the third dictionary data structure; and
   generating the one or more recent network traffic rules based on the one or more intermediate rules.

9. The method of claim 8, wherein generating the one or more recent network traffic rules comprises:
   generating the one or more recent network traffic rules based on inserting a communication protocol and a traffic direction into the one or more intermediate rules.

10. The method of claim 1, wherein determining the new recommended network traffic rule comprises:
    consolidating the one or more recent network traffic rules with the historical proposed traffic rules to obtain a plurality of consolidated network traffic rules associated with a first security group from the one or more security groups; and
    determining the new recommended network traffic rule based on the plurality of consolidated network traffic rules.

11. The method of claim 10, wherein consolidating the one or more recent network traffic rules with the historical proposed traffic rules to obtain the plurality of consolidated network traffic rules comprises:

determining the one or more recent network traffic rules and the historical proposed traffic rules associated with the first security group;

generating a destination port data structure based on the one or more recent network traffic rules and the historical proposed traffic rules associated with the first security group, wherein the destination port data structure indicates a set of destination ports used for the first security group; and obtaining the plurality of consolidated network traffic rules based on the destination port data structure.

12. The method of claim 11, wherein consolidating the one or more recent network traffic rules with the historical proposed traffic rules to obtain the plurality of consolidated network traffic rules further comprises:

updating the destination port data structure based on a number of destination ports within the set of destination ports and duplicate destination ports within the destination port data structure.

13. The method of claim 11, wherein consolidating the one or more recent network traffic rules with the historical proposed traffic rules to obtain the plurality of consolidated network traffic rules further comprises:

based on determining the one or more recent network traffic rules and the historical proposed traffic rules associated with the first security group, generating merged IP address lists indicating merged client machine IP address octets or merged server machine IP address octets associated with the first security group; and generating one or more intermediate consolidated network traffic rules based on the destination port data structure and the merged IP address lists, wherein obtaining the plurality of consolidated network traffic rules is based on comparing a first number of the one or more intermediate consolidated network traffic rules with one or more thresholds.

14. The method of claim 13, wherein obtaining the plurality of consolidated network traffic rules comprises:

determining to update one or more octets from the client machine IP address octets and the server machine IP address octets based on comparing the first number of the one or more intermediate consolidated network traffic rules with a first threshold;

updating the one or more intermediate consolidated network traffic rules based on the one or more updated octets; and obtaining the plurality of consolidated network traffic rules based on the comparing a second number of the one or more updated intermediate consolidated network traffic rules with a second threshold.

15. The method of claim 10, wherein determining the new recommended network traffic rule comprises:

comparing IP address octets from the plurality of consolidated network traffic rules with service tags associated with one or more current network traffic rules; and generating the new recommended network traffic rule based on the comparison.

16. The method of claim 15, wherein generating the new recommended network traffic rule comprises:

generating the new recommended network traffic rule using the service tags associated with the one or more current network traffic rules.

17. The method of claim 10, wherein determining the new recommended network traffic rule comprises:

comparing one or more ports from the plurality of consolidated network traffic rules with one or more ports from one or more current network traffic rules; and generating the new recommended network traffic rule based on the comparison.

18. The method of claim 10, wherein applying the new recommended network traffic rule to the network data transferred between the server machine and the one or more client machines comprises:

assigning a priority to the new recommended network traffic rule; and applying the new recommended network traffic rule based on the assigned priority.

19. An enterprise organization cloud computing platform for generating network traffic rules for a cloud environment, comprising:

one or more processors; and a non-transitory computer-readable medium having processor-executable instructions stored thereon, wherein the processor-executable instructions, when executed by the one or more processors, facilitate:

generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports;

determining one or more recent network traffic rules based on the one or more generated dictionary data structures;

determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

20. A non-transitory computer-readable medium having processor-executable instructions stored thereon, wherein the processor-executable instructions, when executed, facilitate:

generating one or more dictionary data structures based on a plurality of data logs, wherein each of the one or more dictionary data structures comprise a key and a value, wherein the key indicates two of three elements from the plurality of data logs and the value indicates the other element from the plurality of data logs, and wherein the three elements indicates a plurality of server machine internet protocol (IP) addresses, a plurality of client machine IP addresses, and a plurality of destination ports;

determining one or more recent network traffic rules based on the one or more generated dictionary data structures;

determining a new recommended network traffic rule based on one or more security groups associated with the plurality of data logs and consolidating the one or more recent network traffic rules with historical proposed traffic rules; and applying the new recommended network traffic rule to network data transferred between a server machine and one or more client machines.

* * * * *